(12) United States Patent
Sato et al.

(10) Patent No.: US 7,702,657 B2
(45) Date of Patent: Apr. 20, 2010

(54) PORTABLE INFORMATION PROCESSOR

(75) Inventors: Tsuyoshi Sato, Kawagoe (JP); Yoshiya Nonaka, Kawagoe (JP); Takeharu Arakawa, Kawagoe (JP); Masashi Tanabe, Kawagoe (JP); Hitoshi Ando, Kawagoe (JP); Tadahiro Miyoshi, Tokyo (JP); Haruhiko Takagi, Tokyo (JP); Motoyuki Yamashita, Tokyo (JP); Kazuyuki Uchiyama, Tokyo (JP)

(73) Assignee: Pioneer Corporation, Tokyo (JP)

( * ) Notice: Subject to any disclaimer, the term of this patent is extended or adjusted under 35 U.S.C. 154(b) by 398 days.

(21) Appl. No.: 11/878,044

(22) Filed: Jul. 20, 2007

(65) Prior Publication Data
US 2007/0294549 A1 Dec. 20, 2007

Related U.S. Application Data

(62) Division of application No. 10/593,452, filed as application No. PCT/JP2005/005032 on Mar. 18, 2005.

(30) Foreign Application Priority Data
Mar. 19, 2004 (JP) ............................. 2004-081096

(51) Int. Cl.
*G06F 7/00* (2006.01)
(52) U.S. Cl. ...................... 707/104.1; 707/1; 707/102; 340/989; 340/990; 340/995.1; 342/350; 342/352; 342/357.01; 342/357.06; 701/1; 701/24; 701/25; 701/26; 701/200; 701/207; 701/208; 701/213

(58) Field of Classification Search ................ 707/1, 707/102, 104.1; 340/989, 990, 995.1; 342/350, 342/352, 357.01, 357.06; 701/1, 24, 25, 701/26, 200, 207, 208, 213
See application file for complete search history.

(56) References Cited

U.S. PATENT DOCUMENTS 5,897,602 A * 4/1999 Mizuta ....................... 701/201
(Continued)

FOREIGN PATENT DOCUMENTS

EP          1 338 866 A2      8/2003
(Continued)

OTHER PUBLICATIONS

Japanese Patent Office issued a Japanese Office Action dated Aug. 24, 2009, Application No. 2006-253317.

*Primary Examiner*—Etienne P LeRoux
*Assistant Examiner*—Bruce A Witzenburg
(74) *Attorney, Agent, or Firm*—Young & Thompson

(57) ABSTRACT

A portable information processor (10) includes a storage unit (11) that stores information; a connecting unit (12) that connects to one of the device (1 (or 2)); an information acquiring unit (13) that acquires information from the connected device (1 (or 2)); an operation information generating unit (14) supplied with a driving power from a power source of the connected device (1 (or 2)) and generating operation information relating to the predetermined operation executable by the connected device (1 (or 2)) based on device identification information and the acquired information acquired by the information acquiring unit (13), and the information stored in the storage unit (11); and a control unit (15) that controls the connected device (1 (or 2)) based on the operation information generated by the operation information generating unit (14).

2 Claims, 14 Drawing Sheets

U.S. PATENT DOCUMENTS

| | | |
|---|---|---|
| 6,307,485 B1 | 10/2001 | Hasegawa |
| 6,509,869 B2 * | 1/2003 | Aoyama ................ 342/357.13 |
| 6,515,621 B2 * | 2/2003 | Aoyama ................ 342/357.13 |
| 6,747,578 B1 * | 6/2004 | Lam et al. ..................... 341/22 |
| 6,999,779 B1 * | 2/2006 | Hashimoto .............. 455/456.2 |
| 2002/0137477 A1 | 9/2002 | Sawada |
| 2002/0143466 A1 | 10/2002 | Mutoh |
| 2002/0196189 A1 | 12/2002 | Choi |
| 2003/0084313 A1 | 5/2003 | Tada |
| 2003/0163254 A1 | 8/2003 | Chen et al. |
| 2003/0208314 A1 | 11/2003 | Funk et al. |
| 2003/0229796 A1 | 12/2003 | Shih |

FOREIGN PATENT DOCUMENTS

| | | |
|---|---|---|
| JP | 11-016325 | 1/1999 |
| JP | 11-175457 | 7/1999 |
| JP | 2002-049624 | 2/2002 |
| JP | 2002-148052 | 5/2002 |
| JP | 2002-296045 | 10/2002 |
| JP | 2003-035554 | 2/2003 |
| JP | 2003-101566 | 4/2003 |
| JP | 2003-284161 | 10/2003 |
| JP | 2003-303028 | 10/2003 |
| WO | 96/14558 | 5/1996 |
| WO | 98/22831 | 5/1998 |
| WO | 01/55511 | 8/2001 |

* cited by examiner

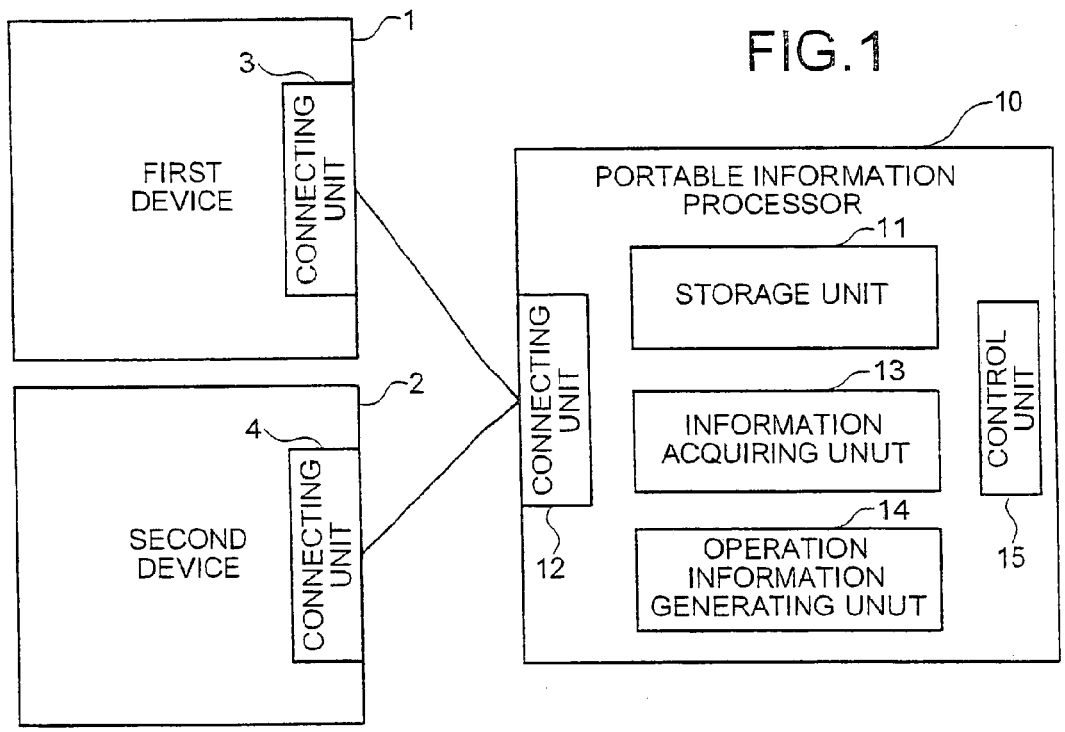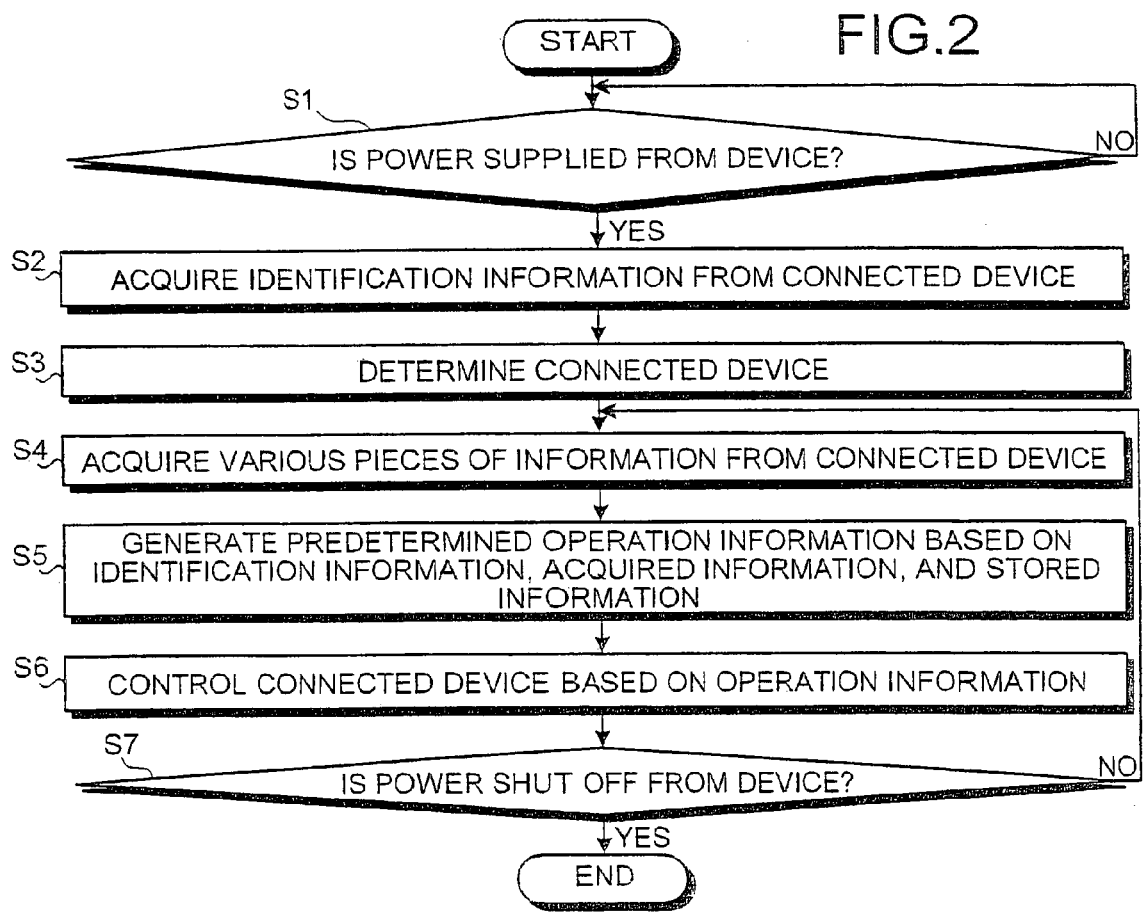

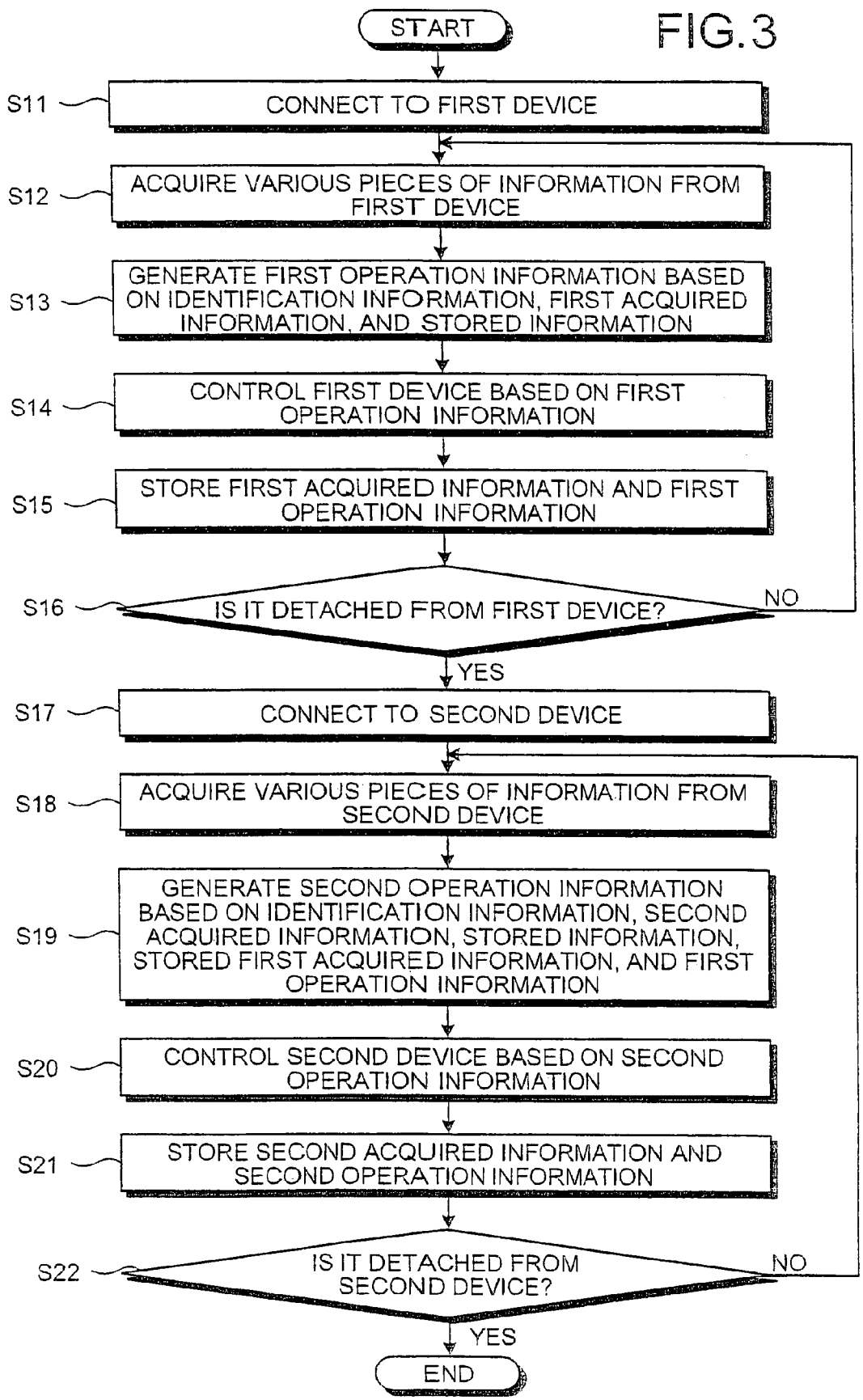

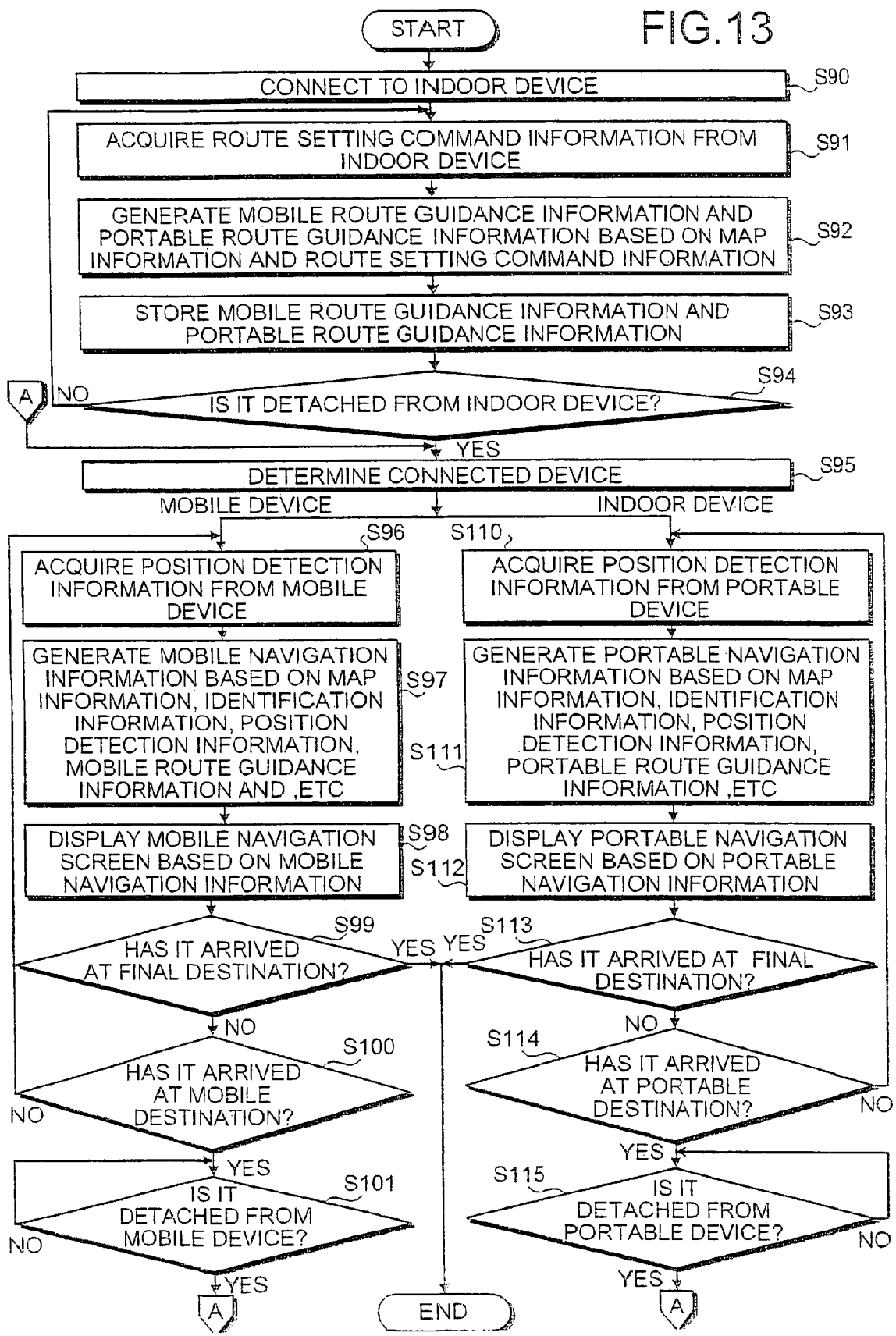

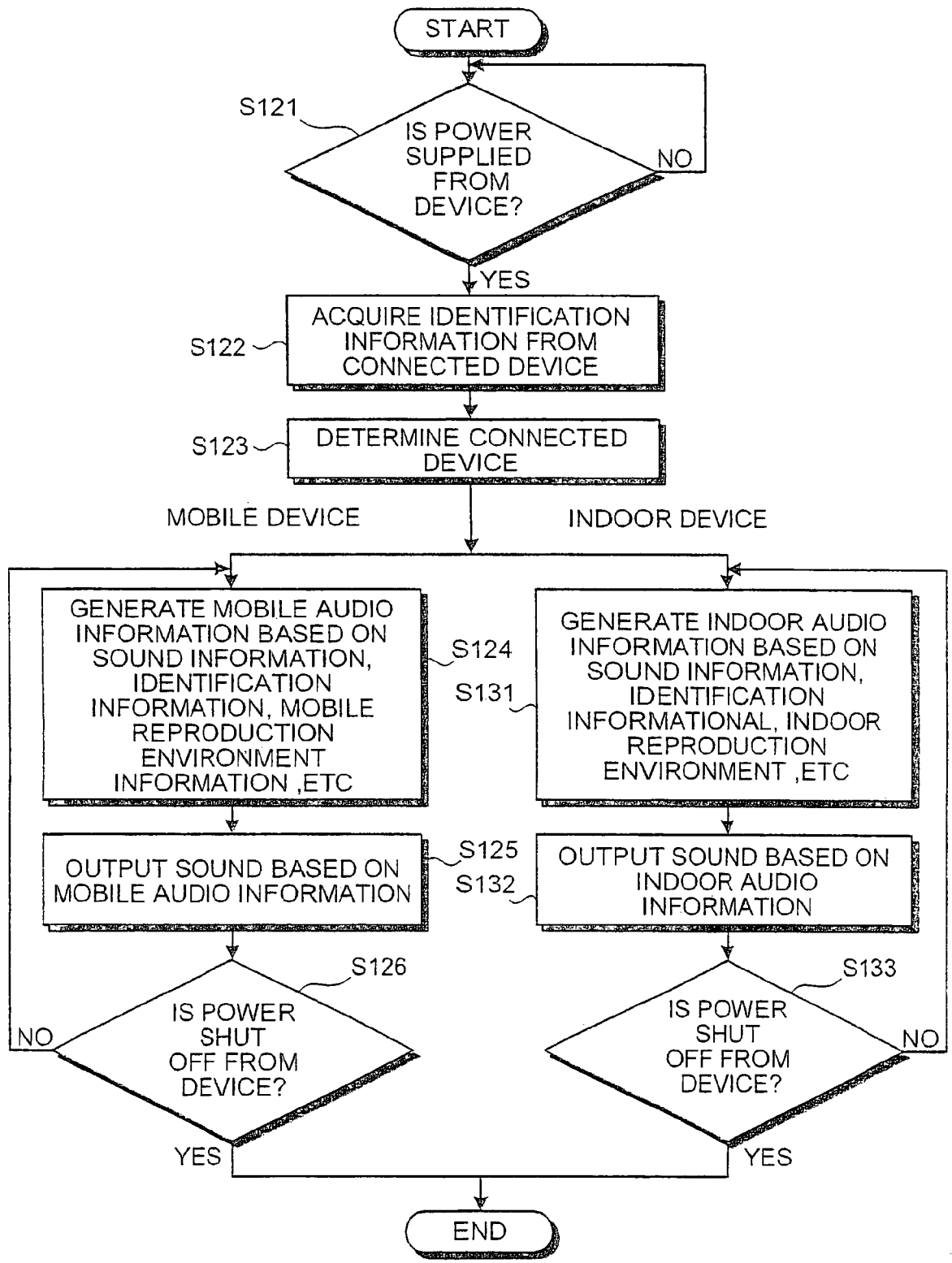

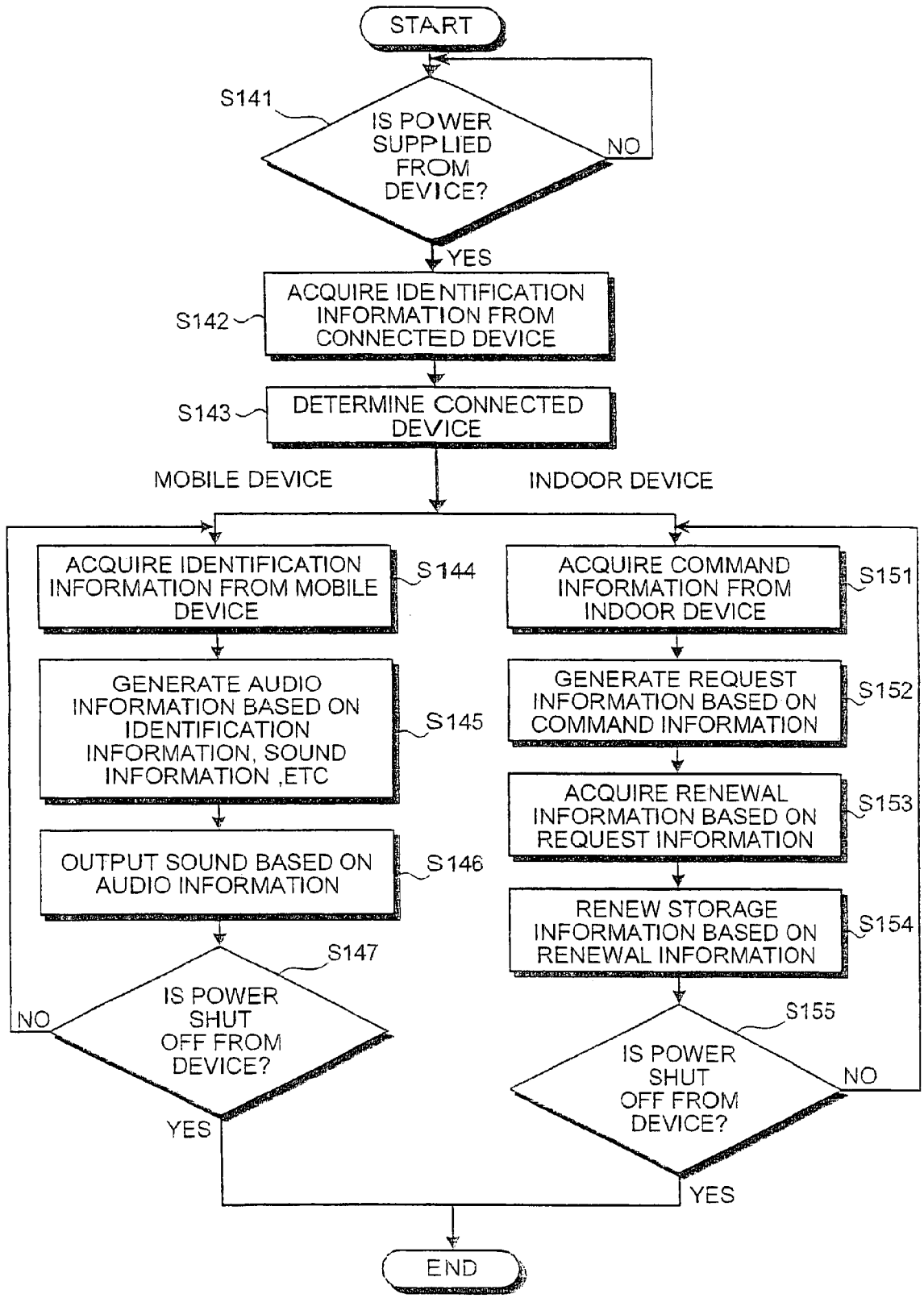

PORTABLE INFORMATION PROCESSOR

This is a division of Ser. No. 10/593,452, Filed Sep. 19, 2006, which is the 35 USC 371 National Stage of international application PCT/JP2005/005032 filed on Mar. 18, 2005, which claims priority to Japanese application 2004-081096 filed on Mar. 19, 2004. The entire contents of each of these applications are hereby expressly incorporated by reference.

TECHNICAL FIELD

The present invention relates to a portable information processor.

BACKGROUND ART

Conventionally, such a navigation device has been available that a part of the navigation device installed in a vehicle is detached so that navigation can be performed when the user is not only at the wheel, but also walking (for example, see the following Patent Document 1).

Patent Document 1: Japanese Patent Laid-Open Publication No. 2000-35554

DISCLOSURE OF INVENTION

Problem to be Solved by the Invention

However, the navigation device has a problem in that, since a display for navigation has a size suitable to be mounted and used in a vehicle, it is inconvenient for the user to carry and use the navigation device while walking as the size is large. Inside a house and the like, displays such as a television and a display of a personal computer are installed, which are larger in size than the display of an in-vehicle navigation device. When the navigation device is carried back into the house to make a route setting and the like, there is no need for the display of the navigation device if the display installed inside the house is used. Thus, a problem is cited that the navigation device provided with this unnecessary display must be carried on.

Means for Solving Problem

To solve the above problems and to achieve an object, a portable information processor according to the invention of claim 1 is detachably attachable to a plurality of devices including a power source, is portable when detached from the device, and includes a storage unit that stores information; a connecting unit that connects any one of the devices from among the device; an information acquiring unit that acquires information from the device connected by the connecting unit; an operation information generating unit supplied with a driving power from the power source of the connected device when connected to the connecting unit, and generating the operation information relating to a predetermined operation executable by the connected device based on device identification information acquired by the information acquiring unit and the acquired information as well as the stored information stored in the storage unit, and a control unit that controls the connected device based on the operation information generated by the operation information generating unit.

BRIEF DESCRIPTION OF DRAWINGS

FIG. 1 is a schematic illustration showing an embodiment of a portable information processor;

FIG. 2 is a flowchart showing a basic control by the portable information processor;

FIG. 3 is a flowchart showing the control at the time when the portable information processor is connected to a different device;

FIG. 13 is a flowchart showing an example of performing the connection change of the portable information processor to a plurality of devices so as to allow each of the devices to be operated;

FIG. 14 is a flowchart showing an example of performing the connection change of the portable information processor and audio output processing according to each reproduction environment of the mobile device and the indoor device; and FIG. 15 is a flowchart showing an example of performing the connection change of the portable information processor and acquiring audio information and the like output by the mobile device from an information source by using the indoor device.

EXPLANATIONS OF LETTERS OR NUMERALS

Figure 4:
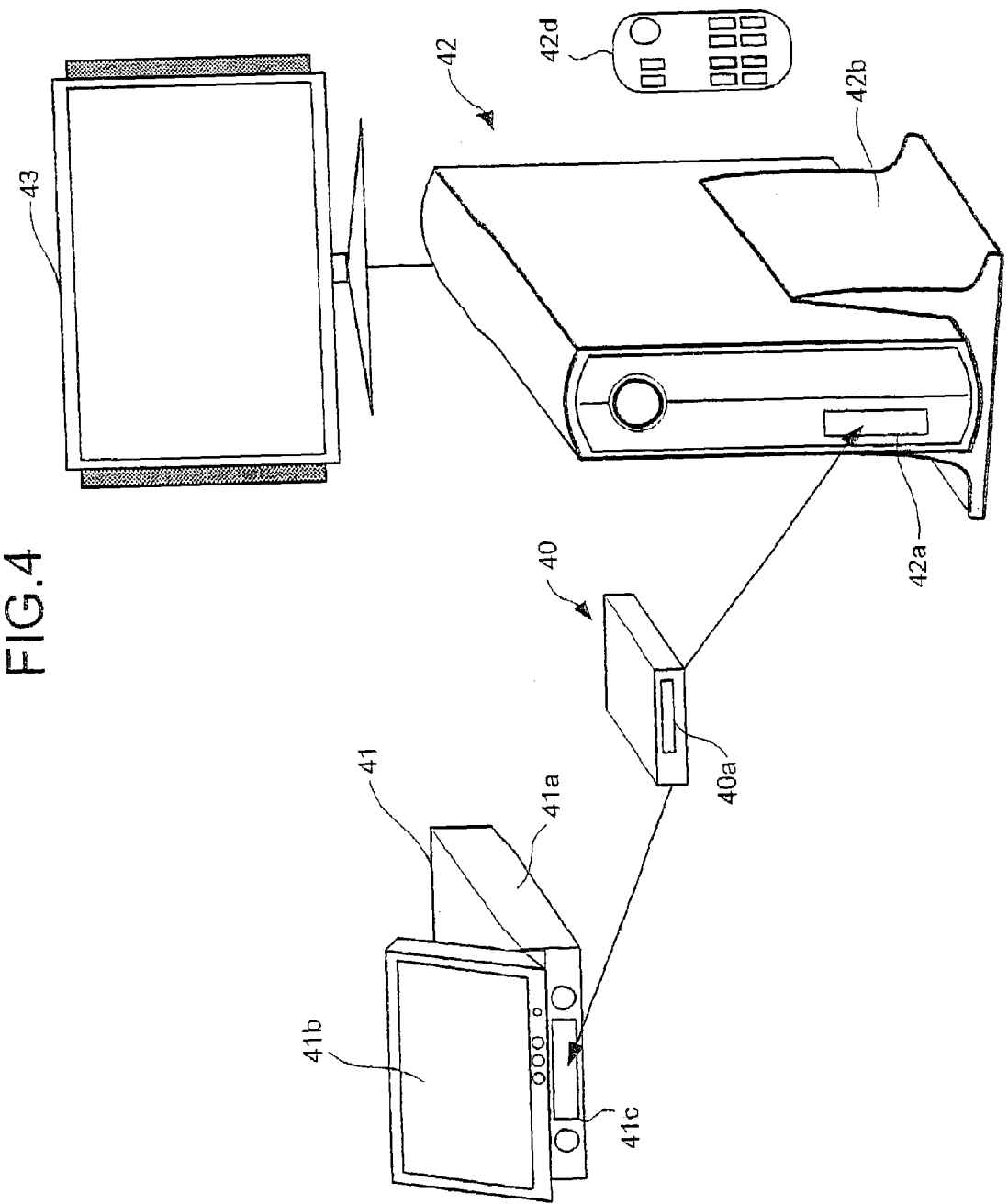
FIG. 4 is a view showing a specific example of how the portable information processor is used.

1 First device
2 Second device
3, 4, 12 Connecting unit
10 Portable information processor
11 Storage unit
13 Information acquiring unit
14 Operation information generating unit
15 Control unit
40 Brain unit
41 Mobile device (car navigation device)
41*b*, 101 Display unit
42 Indoor device (living unit)
43 Image display unit
61 CPU
66 HDD
76, 85, 102 Operating unit
80, 89, 103 Sound input/output unit

BEST MODE(S) FOR CARRYING OUT THE INVENTION

Exemplary embodiments of a portable information processor according to the present invention will be explained below in detail with reference to the accompanying drawings.

Embodiment

Basic Configuration of Portable Information Processor

FIG. 1 is a schematic illustration showing an embodiment of a portable information processor. As shown in FIG. 1, a portable information processor 10 is detachably attachable to a plurality of devices including a power sources. In the example shown in FIG. 1, the devices are shown as a first device 1 and a second device 2. The portable information processor 10, when attached to the first device 1, performs information processing of the information handled by the first device 1, and when attached to the second device 2, performs information processing of the information handled by the second device 2.

This portable information processor 10, when detached from the first device 1 or the second device 2, is configured to be portable and miniaturized so as to be easily carried to a position of other devices. This portable information processor 10 includes a storage unit 11 that stores information, a connecting unit 12 that connects to either one of the devices (a connecting unit 3 of the first device 1 or a connecting unit 4 of the second device 2 in the illustrated example) among the devices, an information acquiring unit 13 that acquires information from the first device 1 or the second device 2, an operation information generating unit 14 that generates operating information relating to the predetermined operation executable by the connected device based on the device identification information acquired by the information acquiring unit 13 and the acquired information as well as stored information stored in the storage unit 11 when connected to any one of the devices and provided with a driving power source from a power source of the connected device, and a control unit 15 that controls the connected device based on the operating information generated by the operation information generating unit 14.

The operation information generating unit 14, when connected to the first device 1, is provided with a driving power from a power source of the connected first device 1, and generates the operating information relating to the predetermined operation executable by the connected first device 1 based on the device identification information acquired by the information acquiring unit 13 and the acquired information as well as the stored information stored in the storage unit 11. Similarly, when connected to the second device 2, the operation information generating unit 14 is provided with a driving power from a power source of the connected second device 2, and generates the operation information relating to the predetermined operation executable by the connected second device 2 based on the device identification information acquired by the information acquiring unit 13 and the acquired information as well as the stored information stored in the storage unit 11. Thus, the portable information processor 10 identifies the devices, and controls the predetermined operation executed by a different device, respectively.

(Basic Control of Portable Information Processor)

FIG. 2 is a flowchart showing a basic control by the portable information processor, and indicates a basic operation by the portable information processor 10 shown in FIG. 1. First, the control unit 15 determines whether the power source is supplied from the device for the portable information processor 10 (step S1). This device is the first device 1 or the second device 2 shown in FIG. 1. During a period until the power source is supplied from the device, the portable information processor 10 is in an inactive state (step S1: loop of NO). When the power source is supplied from the device (step S1: YES), the control unit 15 executes step S2. The supply of the power source from the device is started when the portable information processor 10 is attached to the device (the first device 1 or the second device 2) and the power source of the device is turned ON or when attached to the device with the power source turned ON through the connecting unit 12 of the portable information processor.

Next, the information acquiring unit 13 acquires the identification information specific to the connected device (step S2) and determines the connected device (step S3). After that, the information acquiring unit 13 acquires various pieces of the information from the connected device (step S4). The operation information generating unit 14 generates the operating information relating to the predetermined operation executable by the connected device based on the identification information and various pieces of the information acquired by the information acquiring unit 13 as well as the stored information stored in the storage unit 11, (step S5). Next, the control unit 15 controls the connected device (step S6) based on the operating information. After that, during a period until the power is shut off from the device (step S7: loop of NO), the control unit 15 performs the processing subsequent to step S4, and executes a control of the connected device.

When the power is shut off from the connected device (step S7: YES), the portable information processor 10 terminates the operation. The power is shut off from the device when a command is issued that detaches the portable information processor 10 from the device in a turned ON state (the first device 1 or the second device 2) or when the power source of the device is turned OFF.

(Basic Control when Connection of Portable Information Processor is Changed)

FIG. 3 is a flowchart showing a control when the portable information processor is connected to a different device. FIG. 3 illustrates an example where the first device 1 and the second device 2 shown in FIG. 1 are used as a different device. First, assume that the portable information processor 10 is connected to the first device 1 (step S11). After the portable information processor 10 is connected to the first device 1, assume that the information acquiring unit 13 acquires the device identification information specific to the connected device, and identifies the connected device (execute step S2 and step S3 of FIG. 2).

Next, the information acquiring unit 13 acquires various pieces of information from the connected device 1 (step S12). The operation information generating unit 14 generates first operation information relating to the predetermined operation executable by the connected first device 1 based on the device identification information acquired by the information acquiring unit 13 and first acquired information (various pieces of information acquired at step S12) as well as the stored information stored in the storage unit 11 (step S13). Next, the control unit 15, based on this first operation information, controls the connected first device 1 (step S14). The control unit 15, during a period of controlling the first device 1, stores the first acquired information and the first operating information in the storage unit 11 (step S15). After that, during a period until the portable information processor 10 is detached from the first device 1 (step S16: loop of NO), the control unit 15 continuously performs the processing subsequent to step S12, and executes a control by the connected first device 1.

After the portable information processor 10 is detached from the first device 1 (step S16: YES), assume that this portable information processor 10 is connected to the second device 2 (step S17). Then, assume that the information acquiring unit 13 acquires the device identification information specific to the connected second device 2, and determines the connected device (executes step S2 and step S3 of FIG. 2).

Next, the information acquiring unit 13 acquires various pieces of the information from the connected device 2 (step S18). The operation information generating unit 14 generates the second operation information relating to the predetermined operation executable by the connected second device 2 based on the identification information and the second acquired information (various pieces of the information acquired at step S18) acquired by the information acquiring unit 13 and the stored information stored in the storage unit 11 as well as the first acquired information stored in the storage unit 11 and the first operation information (step S19). Next, the control unit 15 controls the connected second device 2 based on the second operation information (step S20). The control unit 15, during controlling the second device 2, stores the second acquired information and the second operation information in the storage unit 11 (step S21). After that, during a period until the portable information processor 10 is detached from the second device 2 (step S22: loop of NO), the control unit 15 continuously performs the processing subsequent to step S18, and executes a control of the connected second device.

When the portable information processor 10 is detached from the connected second device (step S22: YES), the portable information processor 10 terminates the operation.

In the control step S15, though a control of generating the second operation information is performed by storing both the first acquired information and the operation information based on both of the information at step S19, at step 15, by storing the information on either one of the first acquired information or the first operation information, the second operation information may be generated at step S19 based on the stored information.

Embodiment

Next, an embodiment of the portable information processor will be explained. In the following embodiment, an explanation will be made assuming that the first device is a mobile device mounted on the vehicle, and specifically, it is a car navigation device, and the second device is an indoor device installed inside the home, and specifically it is a living unit. The portable information processor 10 will be explained as a brain unit 40.

(Specific Usage Example of Portable Information Processor)

FIG. 4 is a view showing a specific usage example of the portable information processor. The brain unit 40 is connectable to a mobile device (car navigation device) 41 mounted on a vehicle or connectable to an indoor device (living unit) 42 installed at the home.

The brain unit 40 is configured by a rectangular frame body, and a rear face thereof is provided with the connecting unit 12 including a connector (not shown). This connector is provided with various I/Fs for acquiring various pieces of information from the connected device. The front face of this brain unit 40 is provided with a card slot 40a formed at an aperture portion with various I/Fs. The car navigation device 41 includes a main body 41a and a display unit 41b. The main body 41a is provided with an installation slot 41c installable with the brain unit 40. The inside of this installation slot 41c is provided with a connection connector (the connecting unit 3 of FIG. 1) corresponding to a connector configuring the connecting unit 12 of the brain unit 40. The living unit 42 is connected with an image display unit such as TV and the like. This living unit 42 is also provided with an installation slot 42a installable with the brain unit 40. The inside of this installation slot 42a is provided with a connection connector (the connecting unit 4 of FIG. 1) corresponding to the connector (the connecting unit 12) of the brain unit 40. As illustrated, the living unit 42 can be vertically installed or, though not shown, horizontally installed by using a holder 42b.

(Configuration Example of Connection to Indoor Device)

Figure 5:
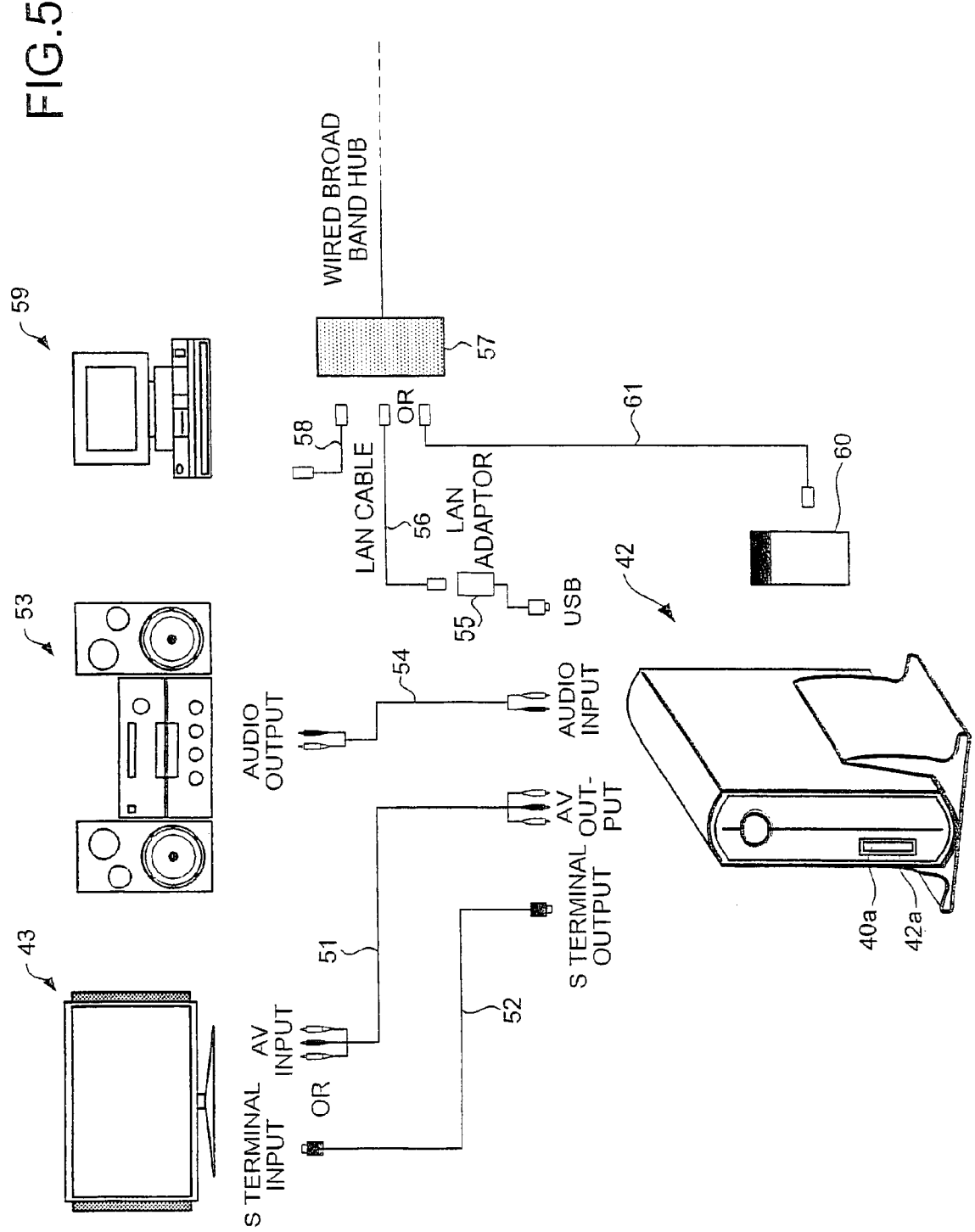
FIG. 5 is a view showing a configuration example of how each type of the device is connected to an indoor device.

FIG. 5 is a view showing a configuration example of the connection of various devices to the indoor device. The rear face of the living unit 42 (see FIG. 4) that is the indoor device is provided with various connecting terminals. The image display unit 43 of the TV and the like are connected to the connecting terminals through an RCA cable 51 and an S image cable 52, and images and sounds can be output to the image display unit 43. In addition, the connecting terminals are connected to an audio device 53 through an RCA cable 54 so that the sound can be output. The connection terminals include a USB terminal (not shown) and are connectable with a LAN adaptor 55 of USB I/F. The LAN adaptor 55 is connected to a network HUB 57 through a LAN cable 56.

The living unit 42 is connectable with a network such as the Internet through the network HUB 57. This network HUB 57 is connectable with a personal computer (PC) 59 including a LAN cable 58 and a network card not shown. Hence, the living unit 42 is network-connected with the PC 59, and can mutually transmit and receive information. The installation slot 42a provided in the front face of the living unit 42 is inserted with the brain unit 40, and the card slot 40a of this brain unit 40 is inserted with a network card 60, so that the living unit 42 can be also connected to the network HUB 57 through a LAN cable 61. This living unit 42 can be remote-controlled by using a remote controller 42d. The brain unit 40 connected to the living unit 42 and the PC 59 are directly connected by the LAN and the USB by using the card slot 40a so that the brain unit 40 can directly communicate the data with the PC 59. The brain unit 40 can be directly connected to the network such as the Internet through the PC 59.

(Internal Configuration when Portable Information Processor is Connected to Mobile Device)

Figure 6:
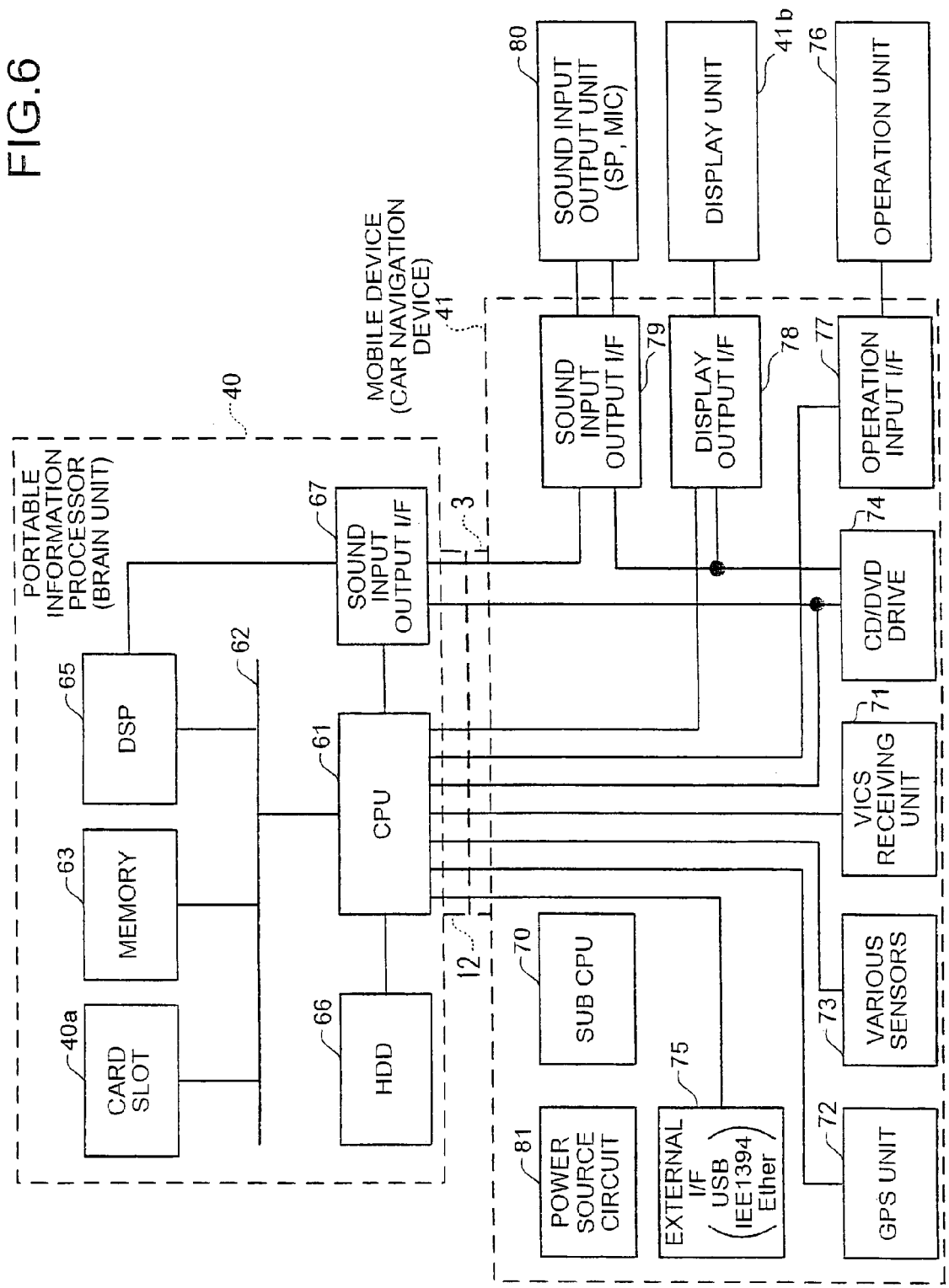
FIG. 6 is a block diagram showing a configuration in a state in which the portable information processor is connected to a mobile device.

FIG. 6 is a block diagram showing a configuration in a state in which the portable information processor is connected to a mobile device. FIG. 6 illustrates a configuration example in which the brain unit 40 is connected to the car navigation device 41. The brain unit 40 is provided with a central control processing unit (CPU) 61 that performs the information processing. This CPU 61 includes functions of the information acquiring unit 13, the operation information generating unit 14, and the control unit 15 shown in FIG. 1. This CPU 61 is connected with a memory 63 such as ROM, and RAM through an internal bus 62. This internal bus 62 is connected with the card slot 40a and a DSP (Digital Signal Processor) 65. The CPU 61 is connected to an HDD 66 as the storage unit 11 and a sound input output I/F 67. The sound input output I/F 67 is connected with the DSP 65, and can also input and output the information applied with a signal processing through the DSP 65. This HDD 66 is stored with various pieces of information such as map information, facility information, and the like to perform a traveling guidance (navigation) operation to be explained later.

This brain unit 40 allows the connecting unit 12 such as connectors and the like to couple with the connecting unit 3 of the car navigation device 41 so as to be mutually electrically connected (see FIG. 1). The car navigation device 41 is provided with a sub CPU 70. This sub CPU 70 performs management of the power source and transmits the identification information to the brain unit 40.

In addition, the car navigation device 41 is provided with various units that input and output various pieces of information to and from the CPU 61 necessary for car navigation, that is, for function of guiding the travel motion of the vehicle. As an information input unit, the car navigation device 41 includes various sensors 73 such as a VICS receiving unit 71 to receive Vehicle Information and Communication System information (VICS), a GPS unit 72 to output information latitude, longitude, and the like so as to detect a position of the vehicle by using a GPS satellite, a vehicle speed sensor, and the like. In addition, as an external I/F 75, the car navigation device 41 includes various I/Fs such as USB, IEEE1394, and Ether. The operating unit 76 performs various operations of the car navigation device 41, and is provided in the front panel and the like of the car navigation device 41. The operation information on this operating unit 76 is output to the CPU 61 through an operation input I/F 77. A CD/DVD drive 74 performs reproduction of music and images stored in the CD and DVD to be inserted. The information acquired by various unit of the car navigation device 41 is output to the CPU 61 of the brain unit 40 through connecting unit 3 and 12 such as connectors and the like.

A display output I/F 78 outputs a display signal output from the CPU 61 or the CD/DVD driver 74 to the display unit 41*b* (see FIG. 4). A sound input/output I/F 79 inputs and outputs sound signals for a sound input/output unit 80. The sound input/output unit 80 is configured by a speaker (SP) that outputs the sound by the input of the sound signal and a microphone that picks up the sound and outputs the sound. This sound input/output unit I/F 79 inputs and outputs the sound signals with the sound input/output I/F 67 of the brain unit 40 or the CD/DVD drive 74. A power source circuit 81 provides a power source for operation to each component part provided in the car navigation device 41. The power source circuit 81 also provides the operation power source to the brain unit 40 through the connecting units 3 and 12 such as the connectors and the like when the brain unit 40 is connected to the car navigation device 41.

(Internal Configuration when Portable Information Processor is Connected to Indoor Device)

Figure 7:
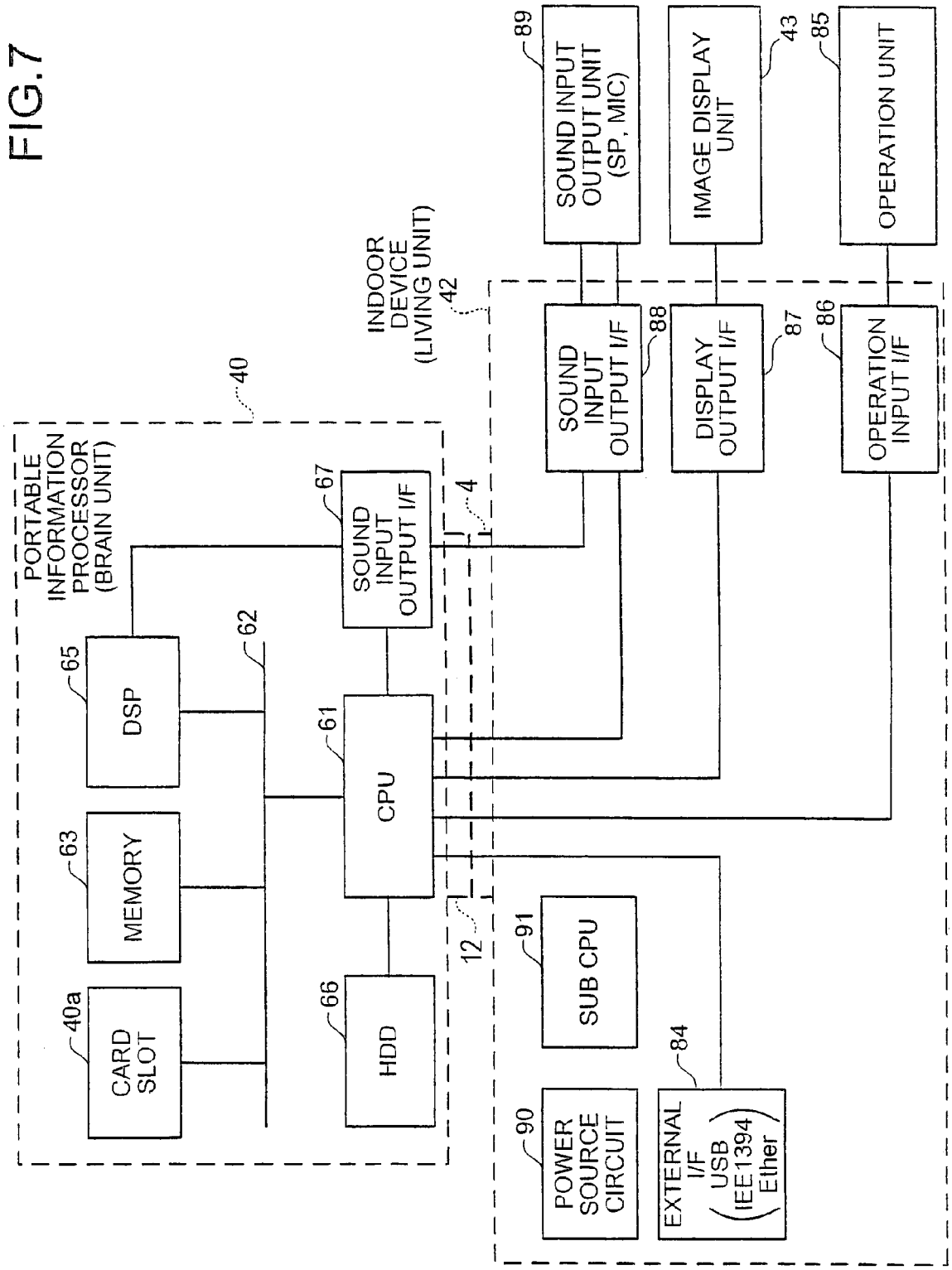
FIG. 7 is a block diagram showing a configuration in a state in which the portable information processor is connected to an indoor device.

FIG. 7 is a block diagram showing a configuration in a state in which the portable information processor is connected to the indoor device. FIG. 7 illustrates an example of a configuration in which the brain unit 40 is connected to the living unit 42. The internal configuration of the brain unit 40 is the same as FIG. 6, and therefore, the explanation thereof will be omitted.

The brain unit 40 allows the connecting unit 12 such as connectors and the like to couple with the connecting unit 4 of the living unit 42 so as to be mutually electrically connected (see FIG. 1). The living unit 42 includes various I/Fs such as USB, IEEE1394, Ether, and the like as an external I/F 84, which correspond to various connecting terminals that connect various devices shown in FIG. 5. The living unit 42 can receive information and can transmit information with these various devices as information sources. The operating unit 85 performs various operations of the living unit 42, and in addition to using the remote controller 42*d* (see FIG. 4), can be provided into the front panel of the living unit 42. The operation information on this operating unit 85 is output to the CPU 61 through the operation input I/F 86. The information acquired by various unit of the living unit 42 is output to the CPU 61 of the brain unit 40 through the connecting unit 4 and 12 such as the connectors and the like.

A display output I/F 87 outputs the display signal output from the CPU 61 to the image display unit (see FIG. 4). A sound input/output I/F 88 inputs sound signals to a sound input out unit 89. The sound input/output unit 89 is configured by a speaker (SP) that outputs the sound by the input of the sound signals and a microphone that picks up the sound and outputs the sound signals. A power source circuit 90 provides an operation power source to each component part provided in the living unit 42. The power source circuit 90 provides the operation power source to the brain unit 40 also through the connecting units 4 and 12 such as connectors and the like when the brain unit 40 is connected to the living unit 42. This living unit 42 is provided with a sub CPU 91. This sub CPU 91 performs management of the power source and transmits identification information to the brain unit 40.

(Specific Control when Portable Information Processor is Connected to Mobile device or Indoor Device)

Figure 8:
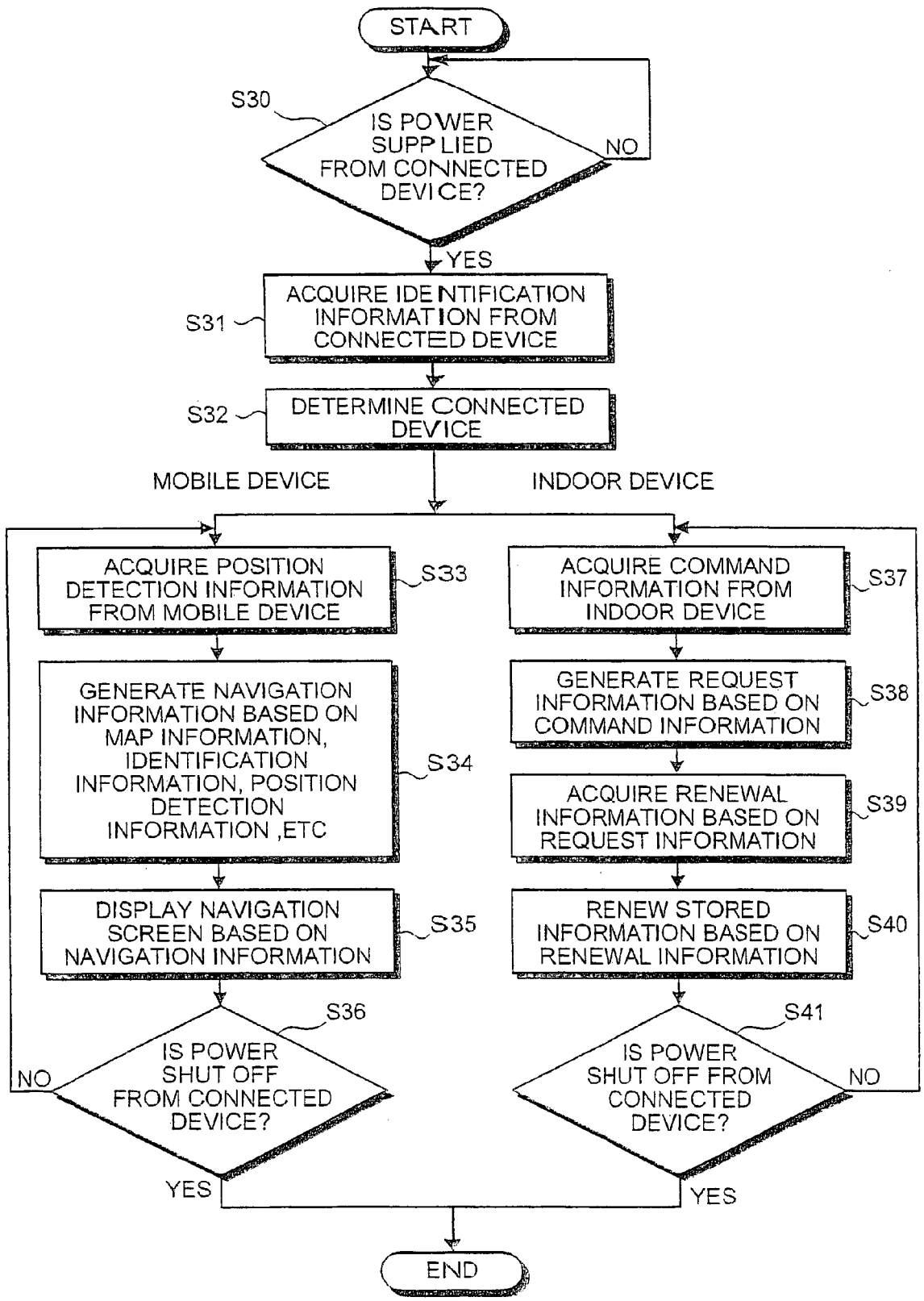
FIG. 8 is a flowchart for explaining a control of each device when the portable information processor is connected to the mobile device or the indoor device.

FIG. 8 is a flowchart to explain the control in each of the device at the time when the portable information processor is connected to the mobile device or the indoor device. In the following explanation, it is assumed that the HDD 66, which is the storage unit, is stored with information that guides vehicle traveling (navigation) such as map information and the like.

First, the brain unit 40 stands ready for the supply of the power source from the connected device (connection device) (step S30: loop of NO), and upon being supplied with power from the connected device (step S30: YES), acquires the identification information from the connected device (step S31), and determines the connected device (step S32).

When a result of determination at step S32 is the connection to the mobile device, the portable information processor (brain unit) 40 controls the operation of this mobile device (car navigation) 41. In the following explanation, an explanation will be made by using a connect configuration of FIG. 6. First, the CPU 61 acquires position detection information from the mobile device 41 (step S33). This position detection information is information output from the GPS unit and various sensors 73, and is information that calculates the present position of the vehicle by the CPU 61. Being not limited to this, this position detection information may be information calculated based on the information output from the GPS unit 72 and various sensors 73 by the calculating units of the sub CPU 70 and the like provided in the mobile device 41. In addition, it may be information calculating the present vehicle position by a calculating unit provided in the GPS unit 72.

Next, the CPU 61 generates navigation information that guides a traveling route based on various pieces of information such as the map information stored in the HDD 66 and the like, the acquired identification information, the position detection information, and the like (step S34). The generation of the navigation information can be performed by using the Vehicle Information and Communication System Information received by the VICS receiving unit 71, destination information on the vehicle traveling set by using the operating unit 76, route information, facility information, and the like as other pieces of information. Based on this navigation information, a navigation image is displayed in the display unit 41*b* (step S35). After that, the presence or absence of the shutting off of the power from the mobile device 41 is detected (step S36), and while the power is not shut off (step S36: NO), the CPU 61 returns to step S33, and continues the processings at step S33 to step S36. On the other hand, when the power is shut off (step S36: YES), the control of the mobile device 41 is terminated.

When a result of the determination at step S32 is the connection to the indoor device, the portable information processor (brain unit) 40 controls the operation of this indoor device (living unit) 42. By using this indoor device, a display of various pieces of the navigation information such as the map information, the facility information, and the like stored in the HDD 66, a change of the traveling route, and a renewal of the map information and the like can be performed. An explanation will be made by using a connect configuration of FIG. 7.

First, the CPU 61 acquires command information from the indoor device 42 (step S37). Specifically, the information acquiring unit 13 shown in FIG. 1 acquires command information from the operation unit operated by the user such as the remote control 42*d* (see FIG. 4). Next, based on this command information, request information for the indoor device 42 is generated (step S38). Specifically, this is executed by the operation information generating unit 14 shown in FIG. 1. The indoor device 42 acquires renewal information based on the request information (step S39). In the processings at steps S38 and S39, renewal information such as new map information are acquired based on this request information through the external I/F 84 and the like provided in the indoor device 42. The CPU 61, based on this renewal information, renews the stored information such as the map information and the like stored in the HDD 66, which is the storage unit (step S40). Specifically, this is executed by the control unit 15 shown in FIG. 1.

During the operation of the indoor device 42, the stored information can be displayed in the image display unit 43 and the like. After that, the presence or absence of the shutting off of the power from the indoor device 42 is detected (step S41), and while the power is not shut off (step S41: NO), the CPU 61 returns to step S37 and continues the processings at steps S37 to S41. On the other hand, when the power is shut off (step S41: YES), a control of the indoor device 42 is terminated.

As explained above, the portable information processor (brain unit) 40 is connected to the indoor device (living unit) 42, so that the stored information stored in the storage unit (HDD 66) provided in the brain unit 40 can be managed.

(Example of Information Processing Using Indoor Device Renewal Processing of Map Information)

Figure 9:
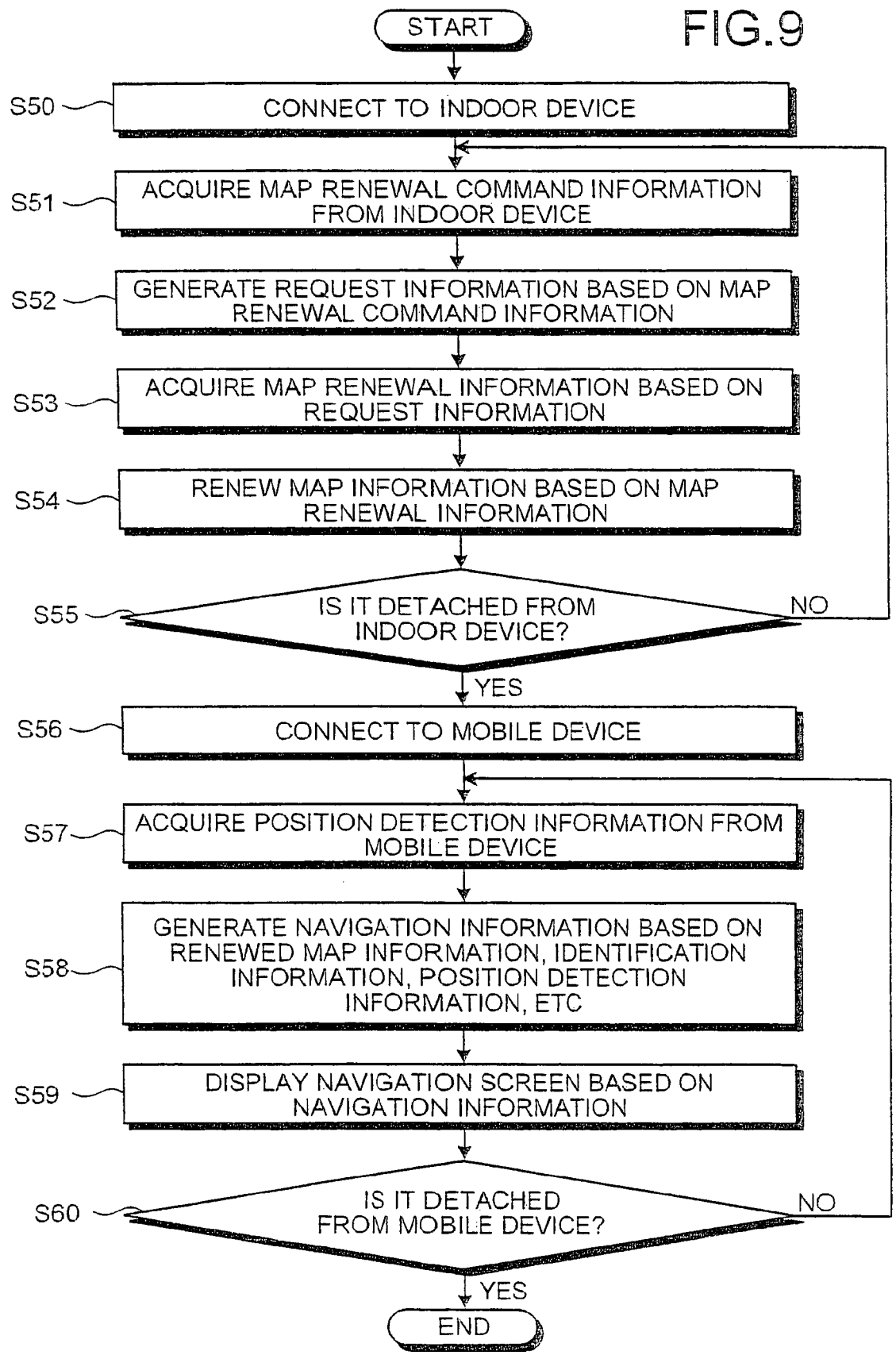
FIG. 9 is a flowchart showing an example of performing a connection change of the portable information processor and renewal processing of the information used in the mobile device.

FIG. 9 is a flowchart showing an example of performing a connection change of the portable information processor and renewal processing of the information used by the mobile device, and indicates an example in which the map information used by the mobile device (car navigation device) 41 is renewed by using the indoor device (living unit) 42.

First, the portable information processor (brain unit) 40 is connected to the indoor device (living unit) 42 (step S50). As a result, the brain unit 40 acquires map renewal command information from the indoor device (living unit) 42 (step S51), and generates request information based on this map renewal command information (step S52). After that, the living unit 42 acquires the map renewal information based on the request information (step S53). Specifically, the brain unit 40 is connected to the Internet and the like through the LAN adaptor 55 shown in FIG. 5, and the renewed map information is downloaded by accessing to a server that controls the map information. These processings are executed by the information acquiring unit 13 and the operation information generating unit 14 shown in FIG. 1. The brain unit 40 renews the map information based on the acquired map renewed information (step S54). Specifically, the control unit 15 shown in FIG. 1 renews the map information stored in the HDD 66 of the brain unit 40 by using the acquired map renewed information.

After that, the presence or absence of the detachment from the indoor device (living unit) 42 is determined (step S55). When the portable information processor (brain unit) 40 remains in a state in which it is installed in the indoor device (living unit) 42 (step S55: NO), the CPU 61 returns to step S51 and continues the processings at steps S51 to S55.

Then, the portable information processor (brain unit) 40 is detached from the indoor device (living unit) 42 (step S55: YES), and is connected to the mobile device (car navigation device) 41 (step S56). As a result, the car navigation device 41 can execute a traveling guide (car navigation) function of a vehicle.

The brain unit 40 acquires the position detection information from the connected mobile device (car navigation device) 41 (step S57). As explained above, this position detection information is acquired by calculating the information such as latitude, longitude, and the like output from the GPS unit 72 (see FIG. 6) and the information output from the various sensors 73 by the CPU 61. Then, the CPU 61 generates the navigation information based on the renewed map information stored in the HDD 66, the identification information, the position detection information, and the like (step S58). Based on this generated navigation information, the navigation screen is displayed in the display unit 41*b* (step S59). At this time, the navigation guidance can be also output from the speaker of the sound input/output unit 80. Such traveling guidance function at the vehicle traveling time is continuously performed during a period when the brain unit 40 is attached to the mobile device (car navigation device) 41 (step S60: NO to loop of step S57). When the brain unit 40 is detached from the mobile device (car navigation device) 41 (step S60: YES), the whole operation of the brain unit 40 including the traveling guidance function is terminated.

In the above explanation, an example of simply renewing the map information has been explained. For example, when it comes to the map information on the whole of Japan, the data amount becomes enormous. Consequently, the brain unit 40 stores the navigation information such as the present position of the mobile device, setting route, and traveling record in the storage unit (HDD 66), and a range of the map information renewed based on this present position, the traveling record and the like is selected, and the map information (for example, Kanto area) on the selected range only can be allowed to be renewed.

As explained above, the brain unit 40 is connected to the mobile device (car navigation device) 41, so that the traveling guidance of a vehicle can be performed. By connecting this brain unit 40 to the mobile device (living unit) 42, the map information necessary for the traveling guidance can be renewed. Thus, a vehicle can be guided always by using the new map information.

(Example of Information Processing by Using Indoor Device-Receiving Processing of Route Information)

Figure 10:
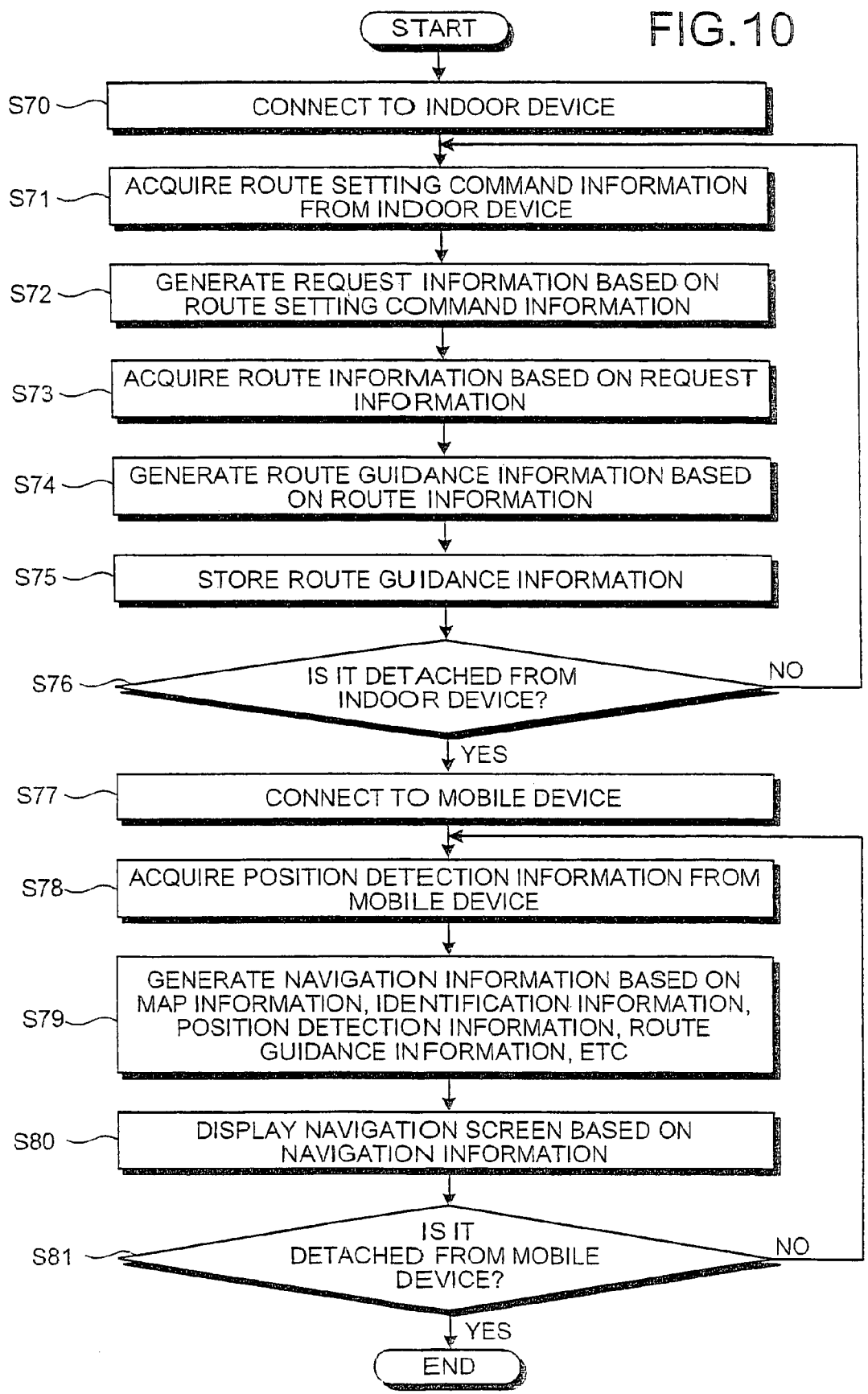
FIG. 10 is a flowchart showing an example of performing a connection change of the portable information processor and renewal processing of the information used in the mobile device.

FIG. 10 is a flowchart showing an example of performing a connection change of the portable information processor and renewal processing of the information used by the mobile device. As a part of the guidance function of the vehicle executed by the mobile device (car navigation device) 41, route guidance information (drive plan information) is provided. This route guidance information is information helpful when setting a traveling route of the vehicle such as the facility information in the destination periphery or the route periphery, the event information, and the like. FIG. 10 illustrates an example of receiving the route information used for the route guidance information by using the indoor device (living unit) 42.

First, the portable information processor (brain unit) 40 is connected to the indoor device (living unit) 42 (step S70). As a result, the brain unit 40 acquires route setting command information from the indoor device (living unit) 42 (step S71), and generates request information based on this route setting command information (step S72). At this time, the route setting command information operates the operation unit 85 (see FIG. 7) provided in the living unit 42, and aims to set and operate a route and the like corresponding to the traveling route of the vehicle.

After that, the living unit 42 acquires the route information based on the request information (step S73). Specifically, the living unit 42 connects the brain unit 40 to the Internet and the like through the LAN adaptor 55 shown in FIG. 5, and accesses to the server managing the route information, and downloads the relevant route information. These processings are executed by the information acquiring unit 13 and the operation information generating unit 14 shown in FIG. 1. After that, the brain unit 40 generates the route guidance information based on the acquired route information (step S74). This route guidance information is stored in the HDD 66 (step S75).

Then, the presence or absence of the detachment from the indoor device (living unit) 42 is determined (step S76). When the portable information processor (brain unit) 40 remains in a state in which it is installed in the indoor device (living unit) 42 (step S76: NO), the CPU 61 returns to step S71 and continues the processings at steps S71 to S76.

After that, the portable information processor (brain unit) 40 is detached from the indoor device (living unit) 42 (step S76: YES), and is connected to the mobile device (car navigation device) 41 (step S77). Thus, the car navigation device 41 can display the route guidance information as a part of the traveling guidance (navigation) function of the vehicle.

The brain unit 40 acquires the position detection information from the connected mobile device (car navigation device) 41 (step S78). After that, the CPU 61 generates the navigation information based on the map information, identification information, position detection information, route guidance information, and the like stored in the HDD 66 step S79). Based on this generated navigation information, the CPU 61 displays a navigation image in the display unit 41b (step S80). In the navigation screen, the route guide information such as the destination periphery scheduled to travel by the vehicle or the facility information in the route periphery or the event information, and the like can be displayed. At this time, the navigation guidance can be also output from the speaker of the sound input and output unit 80. Such traveling guidance function at the vehicle traveling time is continuously performed during a period when the brain unit 40 is attached to the mobile device (car navigation device) 41 (step S81: NO to loop of step S78). When the brain unit 40 is detached from the mobile device (car navigation device) 41 (step S81: YES), the whole operation of the brain unit 40 including the traveling guidance function is terminated.

In the above explanation, an example of simply receiving the route information has been explained. However, the navigation information such as the present position of the mobile body, the traveling record, and the like is kept stored in the storage unit (HDD 66), and a range (acquiring range of the facility information and the event information) of the route information to be received based on this traveling record is selected, and the route information only of the selected range can be allowed to be received.

As explained above, the brain unit 40 is connected to the mobile device (car navigation device) 41, so that the traveling guidance of the vehicle can be performed. At this time, the display and the like of the route guidance information corresponding to the traveling route of the vehicle set by using the living unit 42 can be performed. Hence, at the actual traveling guidance time of the vehicle, the most recent route guidance information (the destination periphery scheduled to travel by the vehicle or the facility information in the route periphery or the event information, and the like) can be displayed.

(Configuration of Portable Device)

Figure 11:
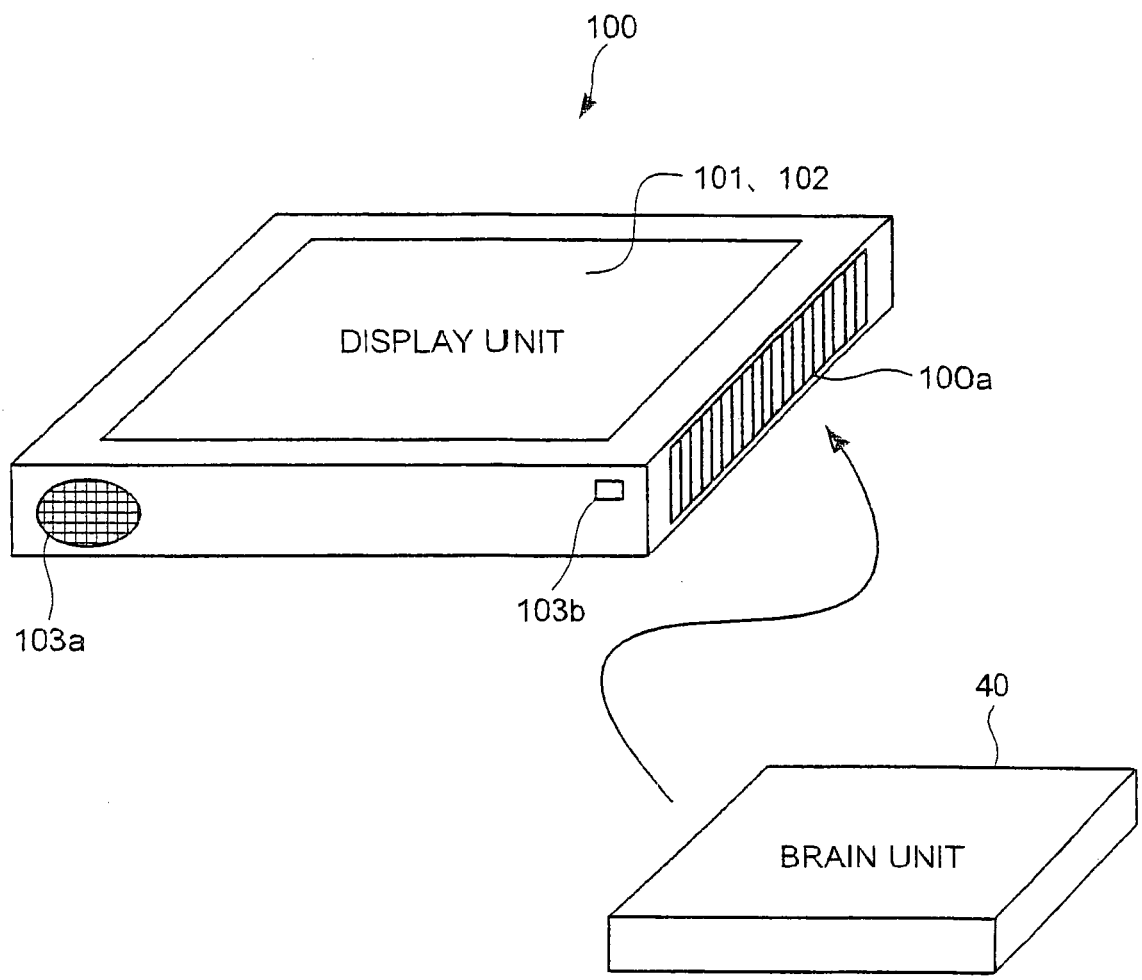
FIG. 11 is a perspective view of a portable device.

FIG. 11 is a perspective view showing the portable device. This portable device 100 is also device installed with the portable information processor (brain unit) 40. The surface of the portable device 100 is provided with a display unit 101 such as a LCD and the like, and the display unit 101 is provided with an operating unit 102 such as a touch panel and the like. On the side surface, a sound output speaker 103a and a microphone 103b are provided.

The side surface of the portable device 100 is provided with an installation slot 100a that installs the brain unit 40. The inside of this installation slot 100a is provided with connecting unit (connector) to be coupled with the connecting unit 12 (see FIG. 1) of the brain unit 40. The rear face and the bottom thereof are provided with various I/F connectors (not shown) that receive and transmit information with the external device. This portable device 100 is equivalent to the device having almost the same function as the mobile device (car navigation device) 41 and miniaturized to the extent of being mobile.

(Internal Configuration When Portable Information Processor is Connected to Portable Device)

Figure 12:
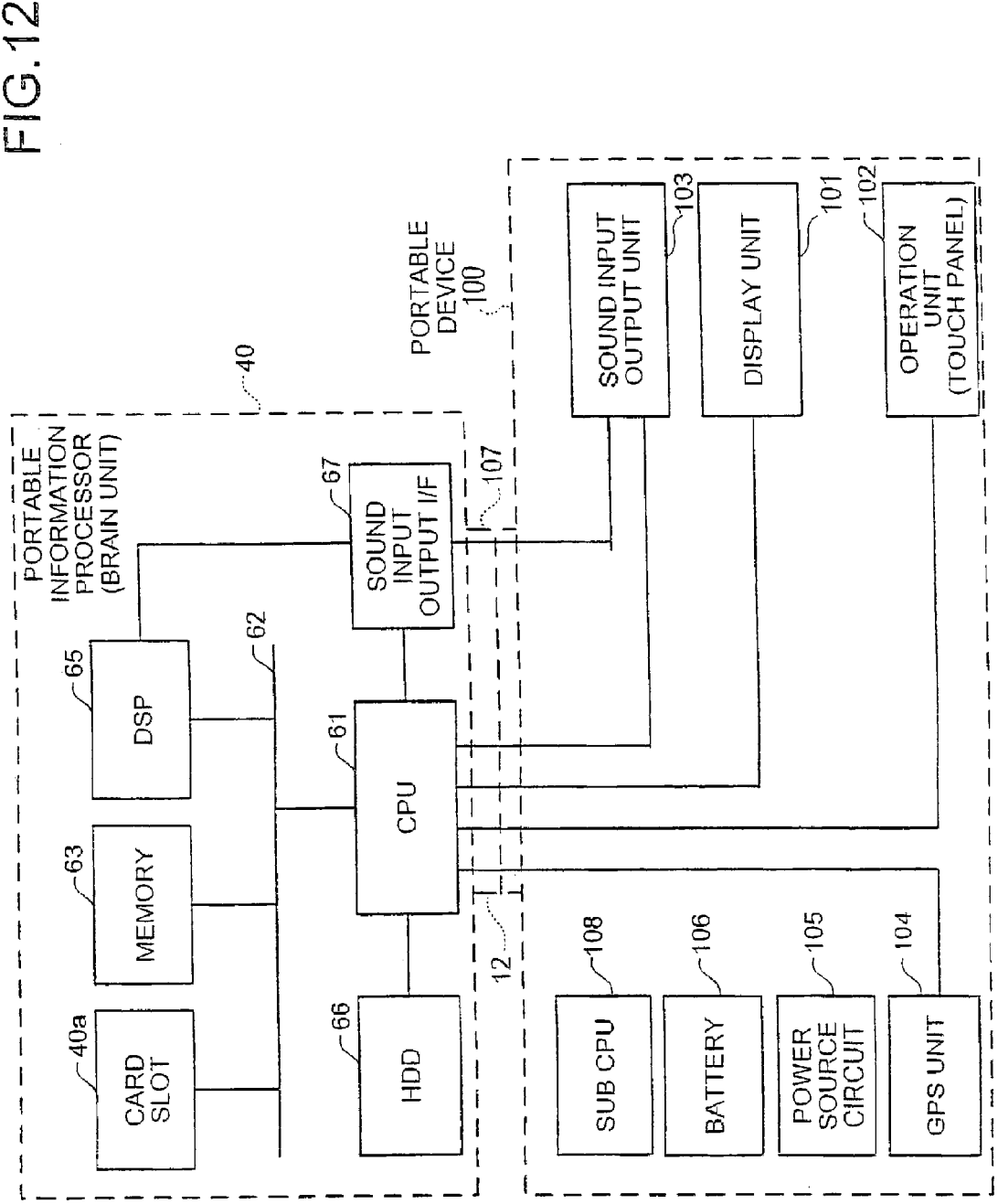
FIG. 12 is a block diagram showing a configuration in a state in which the portable information processor is connected to the portable device.

FIG. 12 is a block diagram showing a configuration in a state in which the portable information processor is connected to the portable device. FIG. 12 illustrates a configuration example in which the brain unit 40 is connected to the portable device 100. The internal configuration of the brain unit 40 is the same as FIG. 6, and therefore, the explanation thereof will be omitted.

A connecting unit 107 of the portable device 100 is coupled with the connecting unit 12 of the connector and the like provided in the brain unit 40 so as to be mutually electrically connected. A display unit 101 displays a display signal output from the CPU 61. The operating unit 102 outputs an operation signal at the time when the touch panel shown in FIG. 11 is operated, to the CPU 61. As the operating unit 102, a keyboard externally connected can also be used. The sound input/output unit 103 is configured by the speaker 103a that outputs the sound by the input of the sound signal and the microphone 103b that picks up the sound and outputs the sound signal. The GPS unit 104 outputs the information such as latitude, longitude, and the like that detects the position of the vehicle by using the GPS satellite. By providing this GPS unit 104, the CPU 61 can calculate the present position of the vehicle and can calculate the position detection information based on the information output from the GPS unit 104 and the like. Based on this position detection information and the map information and the like stored in the HDD 66 and the like, the CPU 61 can also generate the navigation information that guides the traveling route. A power source circuit 105 stabilizes and supplies the power source of a battery 106 to each component part provided in the portable device 100. The power source circuit 105, when the brain unit 40 is connected to the portable device 100, supplies the operation power source also to the brain unit 40 through the connecting unit 107 and 12 such as the connectors. This portable device 100 is provided with a sub-CPU 108. This sub-CPU 108 performs management of the power source, and transmits the identification information to the brain unit 40.

By installing the portable information processor (brain unit) 40 in this portable device 100, the portable device 100 has the same function as the mobile device (car navigation device) 41. Consequently, the processings of steps S33 to S35 explained referring to FIG. 8, the steps S57 to S59 explained referring to FIG. 9, and the steps S78 to S80 referring to FIG. 10 can be similarly executed in this portable device 100. By using the portable device 100, it can be allowed to have the same function as the indoor device in the open regardless of the using places.

Specifically, the brain unit 40 is connected to the portable device 100. Thus, the route (walking) guidance can be performed for the wearer of the portable device 100. At this time, the display and the like of the route guidance information corresponding to the set route can be performed. As a result, at the actual route guidance time, the most recent route guidance information (destination periphery or the facility information on the route periphery, the event information, and the like) can be displayed.

(Operation Example of Each Device when Connected to Two or More Devices)

FIG. 13 is a flowchart showing an example of performing the connection change of the portable information processor to a plurality of devices so as to allow each of the devices to be operated. In the following explanation, an example is shown in which the portable information processor (brain unit) 40 is connected to the indoor device (living unit) 42 or the portable device 100, and by using the living unit 42, the route is set, thereby allowing the mobile device (car navigation device) 41 and the portable device 100 to operate the traveling guidance (navigation) function. The traveling guidance in the portable device 100 is to lead the way mainly at the user walking time or the like.

First, the portable information processor (brain unit) 40 is connected to the indoor device (living unit) 42 (step S90). As a result, the brain unit 40 acquires the route setting command information from the indoor device (living unit) 42 (step S91), and generates mobile route guidance information and portable route guidance information based on the map information and the route setting command information (step S92).

The route setting command information includes the setting of the traveling route of the vehicle in the mobile device (car navigation device) 41 and the setting of the walking route of the user in the portable device 100. This route setting command information unit operating the operating unit 85 (see FIG. 7) provided in the living unit 42 and setting and operating the route and the like corresponding to the traveling route of the vehicle or the walking. The mobile route guidance information is generated in order to perform the traveling guidance of the vehicle in the mobile device (car navigation device) 41. The portable route guidance information is generated in order to perform traveling guidance (walking guidance) of the user in the portable device 100.

Then, the living unit 42 stores the mobile route guidance information and the portable route guidance information in the HDD 66, which is the storage unit (step S93).

After that, the presence or absence of the detachment from the indoor device (living unit) 42 is determined (step S94). When the portable information processor (brain unit) 40 remains in a state of being installed in the indoor device (living unit) 42, the CPU 61 returns to step S91 and continues the processings at steps S91 to S94.

Then, the portable information processor (brain unit) 40 is detached from the indoor device (living unit) 42 (step S94: YES), and is connected to the mobile device 41 or the portable device 100. The brain unit 40 determines the connected device (step S95).

As a result of the determination at step S95, when the connection is made to the mobile device, the CPU 61 executes the processings at steps S96 to S101. Hence, the mobile device (car navigation device) 41 can execute the traveling guidance (car navigation) function of the vehicle. First, the brain unit 40 acquires the position detection information from the mobile device 41 (step S96). Next, based on the map information, identification information, position detection information, mobile route guidance information, and the like, the CPU 61 generates the mobile navigation information (step S97). Then, based on the mobile navigation information, the CPU 61 displays a mobile navigation screen in the display unit 41b (step S98).

The CPU 61 determines whether the vehicle arrives at the final destination (step S99). When not arriving at the final destination (step S99: NO), it is determined whether the vehicle arrives at the mobile destination (step S100). The mobile destination in this example indicates the case where the range of the traveling guidance performed by using the mobile device 41 is set at a position on the way of the route to the final destination. When the vehicle does not arrive at the final destination (step S99: NO) and also during a period when the vehicle does not arrive at the mobile destination (step S100: NO), the CPU 61 returns to step S96, and continues the processings at steps S96 to S100. During this period, the mobile navigation screen is continuously displayed.

When the vehicle arrives at the final destination (step S99: YES), the traveling guidance is terminated. Though the vehicle does not arrive at the final destination (step S99: NO), but arrives at the mobile destination set at a position on the way (step S100: YES), the traveling guidance using the mobile device 41 is terminated. The brain unit 40 stands ready for the detachment from the mobile device 41 (step s101: loop of NO). When the brain unit 40 is detached from the mobile device 41 (step s101: YES), the CPU 61 proceeds to step S95, and determines the connection to another connected device (the portable device 100 in the above case).

As a result of the determination at step S95, when the connection is made to the portable device 100, the CPU 61 executes the processings at steps S110 to S115. Hence, the portable device 100 can execute the traveling guidance (including walking guidance) function. First, the brain unit 40 acquires the position detection information from the portable device 100 (step S110). Next, the brain unit 40 generates portable navigation information based on the map information, identification information, position detection information, portable route guidance information, and the like (step S111). Then, based on the portable navigation information, the brain unit 40 displays a portable navigation screen in the display unit 101 (step S112).

The traveling guidance using the portable device 100 determines whether the vehicle arrives at the final destination (step S113). When not arriving at the final destination (step S113: NO), it is determined whether the vehicle arrives at the destination for the portable device (step S114). The destination for the portable device in this example indicates the case where the range of the traveling guidance performed by using the portable device 100 is set at a position on the way of the route to the final destination. When the vehicle does not arrive at the final destination (step S113: NO) and also during a period when the vehicle does not arrive at the destination for the portable device (step S114: NO), the CPU 61 returns to step S110, and continues the processings at steps S110 to S114. During this period, the portable navigation screen is continuously displayed.

When the vehicle arrives at the final destination (step S113: YES), the traveling guidance is terminated. Though the vehicle does not arrive at the final destination (step S113: NO), but arrives at the destination for the portable device set at a position on the way (step S114: YES), the traveling guidance using the portable device 100 is terminated. Here, the brain unit 40 stands ready for the detachment from the portable device 100 (step S115: loop of NO). When the brain unit 40 is detached from the portable device 100 (step S115: YES), the CPU proceeds to step S95, and determines the connection to another connected device (mobile device 41 in the case of the above explanation).

As explained above, a change of the connection to the mobile device (car navigation device) 41 or to the portable device 100 of the brain unit 40 is performed, so that each device can perform the traveling guidance. At this time, the route guidance information corresponding to the traveling route set for each device by using the living unit 42 can be displayed. For example, first, the traveling guidance (walking guidance) for the route to the vehicle which is the destination for the portable device is performed by wearing the portable device 100, and after riding in the vehicle, by using the mobile device (car navigation device) 41, the traveling guidance of the vehicle to the final destination can be performed. On the other hand, at the beginning, the route to the vehicle which is the mobile destination is traveled by the mobile device 41, and after that, by using the portable device 100, the traveling guidance (walking guidance) to the final destination can be performed. Such guidance can be simply performed only by a change of connection to the mobile device 41 and the portable device 100 of the brain unit 40. Before starting the actual traveling, by using the indoor device (living unit) 42, a route setting can be performed in doors for a plurality of these sets of the device.

According to the above explanation, while the route setting is performed by the indoor device (living unit) 42, it is not limited to this, and the route setting may be performed by the mobile device (car navigation device) 41 or the portable device 100.

In the above explained embodiment, a configuration has been explained in which the brain unit 40 is connected to a plurality of devices such as the mobile device (car navigation device) 41, the indoor device (living unit) 42, and the portable device 100 so that the function of each device is operated. Other functions of these devices such as the mobile device (car navigation device) 41, the indoor device (living unit) 42, and the portable device 100, to each of which the brain unit 40 is connected, will be explained.

The HDD 66 of the brain unit 40 can store the sound information such as music and the like in advance. The mobile device (car navigation device) 41, the indoor device (living unit) 42, and the portable device 100 each have sound input/output units 80, 89, and 103 (see FIGS. 6, 7, and 12), and can reproduce the music. The brain unit 40 is set with the information on the reproduction environment for each of the device connected with the brain unit 40 in advance, and determines the connected device so that the music can be reproduced under the reproduction environment corresponding to each of the device. The reproduction environment includes a tone (equalizer) control according to each of the device, a sound field setting, and the like. As a result, the device connected with the brain unit 40 can be allowed to reproduce the music and the like under the most appropriate reproduction environment. The brain unit 40 allows the information on the reproduction environment to be displayed on the display units 41b and 101 of the connected device as well as the image display unit 43 (see FIGS. 6, 7, and 12) so that the reproduction environment can be set and edited by the command from the operating unit.

The indoor device (living unit) 42 can be connected to the network such as the Internet and the like through the external I/F 84 (see FIG. 7). The indoor device 42 accesses the information source such as the server and the like on the network to obtain the information on the reproduction environment, which can be renewably stored in the HDD 66. Similarly, new sound information is also acquired from the information source on the network, and can be stored in the HDD 66. The information source of the sound information is not limited to the network. The sound information is acquired from the music CD and the like inserted into a CD/DVD drive not shown, and can be also stored in the HDD 66. When the brain unit 40 is connected to the mobile device 41, the sound information is acquired from the music CD and the like inserted into the CD/DVD drive 74, and it is stored in the HDD 66, and then, this brain unit 40 can be played back by using the indoor device (living unit) 42 or the portable device 100.

From the network connectable with the indoor device (living unit) 42, the predetermined information relating to the sound (music) such as the sound information (music information) desired by the user, the music program information showing the music information acquirable, the hit charts, various pieces of the information relating to the stored music information (for example, the content of the music information (names of the music and the artist, time and the like), the music information on the same artist as the relevant music or the information on the artist) and the like are acquired, and can be also stored in the HDD 66. This stored information can be displayed in the display units 41b and 101 as well as the image display unit 43 and the like.

In addition, the sound information stored in the HDD 66 can be edited by using the indoor device (living unit) 42. For example, the setting of the reproduction sequence of the music, the designating of the reproduction places of the sound, the setting of music intervals between before and after the music, the converting of the files of the sound information, and the like can be performed.

The brain unit 40 allows the information stored in the HDD 66 to be made into a visible card by types and files and to be displayed in the display units 41b and 101 of the connected device as well as the image display unit 43 and the like.

(Example of Information Processing by Using Indoor Device-Sound Output Processing According to Reproduction Environment of Plurality of Devices)

FIG. 14 is a flowchart showing an example of performing the connection change of the portable information processor and audio output processing according to each of the reproduction environment of the mobile device and the indoor device, and represents an example of outputting the sound suitable for the reproduction environment of each sound of the mobile device (car navigation device) 41 and the indoor device (living unit) 42.

First, the portable information processor (brain unit) 40 stands ready for the supply of the power source from the connected device (connection device) (step S121: loop of NO), and upon receipt of the supply of the power source from the connected device (step S121: YES), acquires the identification information from the connected device (step S122), and determines the connected device (step S123). When a result of the determination by step S123 is the connection to the mobile device, the portable information processor (brain unit) 40 controls the reproduction environment of the sound in this mobile device (car navigation device) 41.

First, based on the sound information stored in the HDD 66 and the like which are the storage unit, the identification information, mobile reproduction environment information and the like, mobile audio information are generated (step S124). The mobile reproduction environment is the information on the reproduction environment suitable for the mobile device (car navigation device) 41, and for example, includes the information such as the tone (equalizer) control, the sound field setting.

After that, based on the mobile audio information generated at step S124, the sound is output from the speaker of the sound input/output unit 80 (see FIG. 6) of the mobile device (car navigation device) 41 (step S125). After that, the presence or absence of the shutting off of the power from the mobile device (car navigation device) 41 is detected (step S126), and while the power is not shut off (step S126: NO), the CPU 61 returns to step S124, and continues the processings of steps S124 to S126. On the other hand, when the power is shut off (step S126: YES), a control of the sound output by using the mobile device (car navigation device) 41 is terminated.

When a result of the determination by step S123 is the connection to the indoor device, the portable information processor (brain unit) 40 controls the reproduction environment of the sound in this indoor device (living unit) 42.

First, based on the sound information stored in the HDD 66 and the like which are the storage unit, the identification information, reproduction environment information for the indoor and the like, audio information for the indoor are generated (step S131). The reproduction environment information for the indoor device is the information on the reproduction environment of the sound suitable for the indoor device (living unit) 42, and for example, includes the information such as the tone (equalizer) control and the sound field setting according to the indoor device.

After that, based on the audio information for the indoor device generated at step S131, the sound is output from the speaker of the sound input/output unit 89, (see FIG. 7) of the indoor device (living unit) 42 (step S132). After that, the presence or absence of the shutting off of the power from the indoor device (living unit) 42 is detected (step S133), and while the power is not shut off (step S133: NO), the CPU returns to step S131, and continues the processings of steps S131 to S133. On the other hand, when the power is shut off (step S133: YES), a control of the sound output by using the indoor device (living unit) 42 is terminated.

By the way, by using the portable device 100, the sound stored in the HDD 66 can be reproduced. At this time, similarly to the above explained processing, the audio information for the portable device is generated based on the reproduction environment information according to the portable device 100, and based on this audio information for the portable device, the sound can be output from the speaker 103a (see FIG. 11) of the sound input/output unit 103 (see FIG. 7) of the portable device 100.

Although the above explanation is about a processing example at the time when the portable information processor (brain unit) 40 is connected to the mobile device (car navigation) 41 or the portable device 100, as a combination of the device connected with the portable information processor (brain unit) 40 a combination of the mobile device (car navigation) 41 and the portable device 100 is, in addition, available. Besides, a combination of the indoor device (living unit) 42 and the portable device 100 is available. At the time of these combinations, by the processing similarly to FIG. 14, the sound can be output by providing the reproduction environment suitable for each of the device.

(Information Processing Example Using Indoor Device-Processing of Acquiring Sound Information, Etc. Output from One Device by Other Device from Information Source)

FIG. 15 is a flowchart showing an example of performing the connection change of the portable information processor and acquiring audio information and the like output by the mobile device, from information source by using an indoor device. From the information source, the predetermined information relating to the sound (music) such as not only the sound information (music information), but also the music program information indicating the music information acquirable, the hit charts, various pieces of the information relating to the stored music information (for example, the content of the music information (names of the music and the artist, time, and the like), the music information on the same artist as the relevant music or the information on the artist) and the like can be acquired.

First, the portable information processor (brain unit) 40 stands ready for the supply of the power source from the connected device (connection device) (step S141: loop of NO), and upon receiving supply of the power from the connected device (step S141: YES), acquires the identification information from the connected device (step S142), and determines the connected device (step S143). When a result of the determination at step S143 is the connection to the mobile device, the portable information processor (brain unit) 40 controls the reproduction of the sound output in this mobile device (car navigation device) 41.

First, the portable information processor (brain unit) 40 acquires the identification information from the mobile device (car navigation device) 41 (step S144). Next, based on the acquired identification information and the sound information stored in the storage unit such as the HDD 66, the portable information processor (brain unit) 40 generates audio information (step S145). Based on the audio information, the sound is output from the speaker of the sound input/output unit 80 (see FIG. 6) of the mobile device (car navigation device) 41 (step S14). After that, the presence or absence of the shutting off of the power from the mobile device (car navigation device) 41 is detected (step S147), and while the power is not shut off (step S147: NO), the CPU 61 returns to step S144, and continues the processings of step S144 to S147. On the other hands, when the power is shut off (step S147: YES), a control of the sound output by using the mobile device (car navigation device) 41 is terminated.

When a result of the determination at step S143 is the connection to the indoor device, the portable information processor (brain unit) 40 controls the acquisition of the sound information and the like by using this indoor device (living unit) 42.

First, the portable information processor (brain unit) 40 acquires command information acquiring the sound information and the like from the information source by the operation and the like of the operating unit 85 (see FIG. 7) of the indoor device (living unit) 42 (step S151). Next, based on the command information, the portable information processor (brain unit) 40 generates request information for the indoor device (living unit) 42 (step S152). Based on this request information, the indoor device (living unit) 42 accesses an external server and the like (information source) through a network such as the Internet from the external I/F 84 (see FIG. 7), and acquires renewed information such as the music information and the like (step S153). The renewed information indicates the predetermined information relating to the sound (music) such as various pieces of the information relating to the music information stored in the HDD 66 (for example, the content of the relevant music information (names of the music, name of the artist, time, and the like), the music information on the same artist as the relevant music information or the information on the artist himself).

Based on the acquired renewed information, the indoor device (living unit) 42 renews the sound information (in this case, the predetermined information relating to the music information) stored in the HDD 66 (step S154). After that, the presence or absence of the shutting off of the power from the indoor device (living unit) 42 is detected (step S155), and while the power is not shut off (step S155: YES), the CPU 61 returns to the step S151 and continues the processings of steps S151 to S155. On the other hand, when the power is shut off (step S155: YES), a control relating to the acquisition of the music information by using the indoor device (living unit) 42 is terminated.

As explained above, after the portable information processor (brain unit) 40 is connected to the indoor device (living unit) 42 and performs the above explained control, when this portable information processor (brain unit) 40 is connected to the mobile device (car navigation device) 41, the music information acquired by the indoor device (living unit) 42 can be reproduced by using the mobile device (car navigation device) 41. In the explanation using FIG. 15, a configuration is such that the portable information processor (brain unit) 40 is connected either to the mobile device (car navigation device) 41 or to the indoor device (living unit) 42. It is not limited to this, but a configuration can be set such that the portable information processor (brain unit) 40 is connected either to the indoor device (living unit) 42 or to the portable device 100. In this case, the music information acquired by either one of the indoor device (living unit) 42 or the portable device 100 can be reproduced by using the other device.

As explained above, according to the above explained embodiments, the portable information processor miniaturized to the extent of being portable is installed in and connected to the mobile device, the indoor device, or the portable device, so that the function of each of the connected devices can be operated. The portable information processor is provided with the CPU that controls the operation of each of the devices and the storage unit that stores the information. The device to which the portable information processor is connected has each function operated by the CPU, and by using the information stored in the storage unit, these functions can be effectively utilized. Especially, by using each device suitable for vehicle, indoor, and the outdoor, it can be utilized without limitation on location. At different places, for example, doors, the information on the mobile device or the portable device can be set and acquired. These pieces of the information are kept stored in the storage unit of the portable information processor, and can be read from the storage unit of the connected portable information processor while using the mobile device or the portable device.

The information processing method in the portable information processor as explained in the present embodiment can be realized by executing a program prepared in advance by a computer such as a personal computer, and a work station. This program is recorded on a computer-readable recording medium such as a hard disk, a flexible disk, a CD-ROM, an MO, and a DVD, and is executed by being read from the recording medium by the computer. This program may be a transmission medium distributable through a network such as the Internet.

The invention claimed is:

1. A portable information processor that is attachable and detachable to and from both a mobile device and an indoor device, the mobile device installed in a mobile body, detecting a current position of the mobile body, and having a display unit that displays information on the current position on a screen, the indoor device installed indoors and having an information acquiring unit capable of acquiring information externally the portable information processor comprising:
   a storage unit that stores at least map information; and
   a control unit that controls each of the devices
      such that when connected to the mobile device,
      the display unit displays the map information after superimposing, on the map information stored in the storage unit, the current position acquired from the mobile device, and
      when connected to the indoor device, the information acquiring unit acquires information externally to renew the map information stored in the storage unit.

2. The portable information processor according to claim 1, further comprising an acquiring unit that acquires, when connected to each of the mobile device and the indoor device, identification information to identify each of the devices, from the each of the devices, wherein
   the control unit controls each of the devices based on the identification information acquired by the acquiring unit.

* * * * *